US011236997B2

(12) United States Patent
Tanaka et al.

(10) Patent No.: US 11,236,997 B2
(45) Date of Patent: Feb. 1, 2022

(54) SURVEYING INSTRUMENT AND PROGRAM

(71) Applicant: NIKON-TRIMBLE CO., LTD, Tokyo (JP)

(72) Inventors: Tomohiro Tanaka, Kawasaki (JP); Kazuhito Yamada, Yokohama (JP); Koki Sugihara, Yokohama (JP); Naoko Niimi, Yokohama (JP)

(73) Assignee: NIKON-TRIMBLE CO., LTD, Tokyo (JP)

( * ) Notice: Subject to any disclaimer, the term of this patent is extended or adjusted under 35 U.S.C. 154(b) by 410 days.

(21) Appl. No.: 15/520,185

(22) PCT Filed: Oct. 24, 2014

(86) PCT No.: PCT/JP2014/078390
§ 371 (c)(1),
(2) Date: Apr. 19, 2017

(87) PCT Pub. No.: WO2016/063419
PCT Pub. Date: Apr. 28, 2016

(65) Prior Publication Data
US 2017/0307370 A1    Oct. 26, 2017

(51) Int. Cl.
*G01C 1/02* (2006.01)
*G01C 1/04* (2006.01)
(Continued)

(52) U.S. Cl.
CPC ............... *G01C 1/02* (2013.01); *G01C 1/04* (2013.01); *G01C 15/002* (2013.01); *G01S 5/163* (2013.01);
(Continued)

(58) Field of Classification Search
None
See application file for complete search history.

(56) References Cited

U.S. PATENT DOCUMENTS 5,100,229 A * 3/1992 Lundberg ............. G01C 15/002
356/3.12
2003/0048355 A1    3/2003 Shimoyama et al.
(Continued)

FOREIGN PATENT DOCUMENTS

CN    1538147 A    10/2004
JP    H06-94460 A    4/1994
(Continued)

OTHER PUBLICATIONS

Jan. 11, 2019 Office Action and Search Report issued in Chinese Patent Application No. 201480082865.5.
(Continued)

*Primary Examiner* — Hovhannes Baghdasaryan
(74) *Attorney, Agent, or Firm* — Oliff PLC

(57) ABSTRACT

A surveying instrument includes: a survey system; an image sensing system, including first and second image sensing units, the second having an angle of view wider than that of the first; horizontal and vertical angle drivers to rotate the survey and image sensing systems around a surveying instrument vertical and horizontal axes, respectively; a data storage part; an angle detecting part; and a control unit to cause an image, based on image data the first or second generates after imaging, a design data object for showing the design data portion locations included in the image, and coordinate measurement point objects for showing the coordinate measurement points locations, to be surveyed, corresponding to the design data portion included in the image, to appear on a representation device in response to the design data stored in the data storage part and the detected angle.

27 Claims, 18 Drawing Sheets

(51) Int. Cl.
  *G01C 15/00*  (2006.01)
  *G01S 5/16*  (2006.01)
  *G06K 9/32*  (2006.01)
  *G06T 3/00*  (2006.01)
  *G06T 3/40*  (2006.01)

(52) U.S. Cl.
  CPC .............. *G06K 9/32* (2013.01); *G06T 3/0062* (2013.01); *G06T 3/4038* (2013.01)

(56) References Cited

U.S. PATENT DOCUMENTS

| | | | |
|---|---|---|---|
| 2004/0234123 A1* | 11/2004 | Shirai | G01C 11/00 |
| | | | 382/154 |
| 2004/0246468 A1 | 12/2004 | Ohtomo et al. | |
| 2006/0021236 A1 | 2/2006 | Endo | |
| 2007/0104353 A1* | 5/2007 | Vogel | G01C 1/04 |
| | | | 382/106 |
| 2007/0195313 A1* | 8/2007 | Haijima | G01C 5/02 |
| | | | 356/138 |
| 2009/0225161 A1 | 9/2009 | Otani et al. | |
| 2010/0303300 A1* | 12/2010 | Svanholm | G01C 1/04 |
| | | | 382/106 |
| 2011/0075886 A1 | 3/2011 | Ashjaee et al. | |
| 2012/0014564 A1 | 1/2012 | Jensen | |
| 2012/0320193 A1* | 12/2012 | Lienhart | G01C 1/04 |
| | | | 348/135 |
| 2014/0237833 A1* | 8/2014 | Schubert | G01C 9/06 |
| | | | 33/365 |
| 2015/0176991 A1 | 6/2015 | Maruyama | |

FOREIGN PATENT DOCUMENTS

| | | |
|---|---|---|
| JP | H11-88767 A | 3/1999 |
| JP | 2000-074664 A | 3/2000 |
| JP | 2004-333211 A | 11/2004 |
| JP | 2005-03448 A | 1/2005 |
| JP | 2006-046920 A | 2/2006 |
| JP | 2009-210388 A | 9/2009 |
| JP | 2011-75563 A | 4/2011 |
| WO | 2014/017622 A1 | 1/2014 |

OTHER PUBLICATIONS

Jun. 19, 2018 Extended Search Report issued in European Patent Application No. 14904350.7.
Apr. 25, 2017 International Preliminary Report on Patentability issued in International Patent Application No. PCT/JP2014/078390.
Mar. 13, 2018 Office Action issued in Japanese Patent Application No. 2016-555038.
Jan. 27, 2015 Search Report issued in International Patent Application No. PCT/JP2014/078390.

* cited by examiner

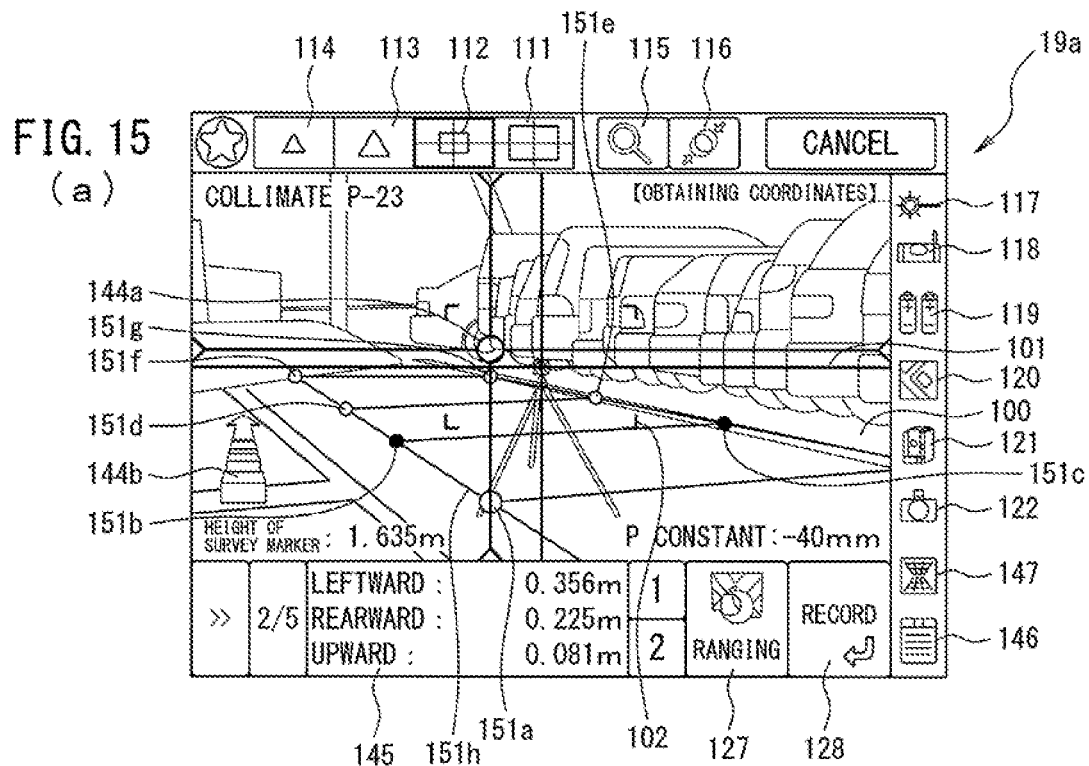
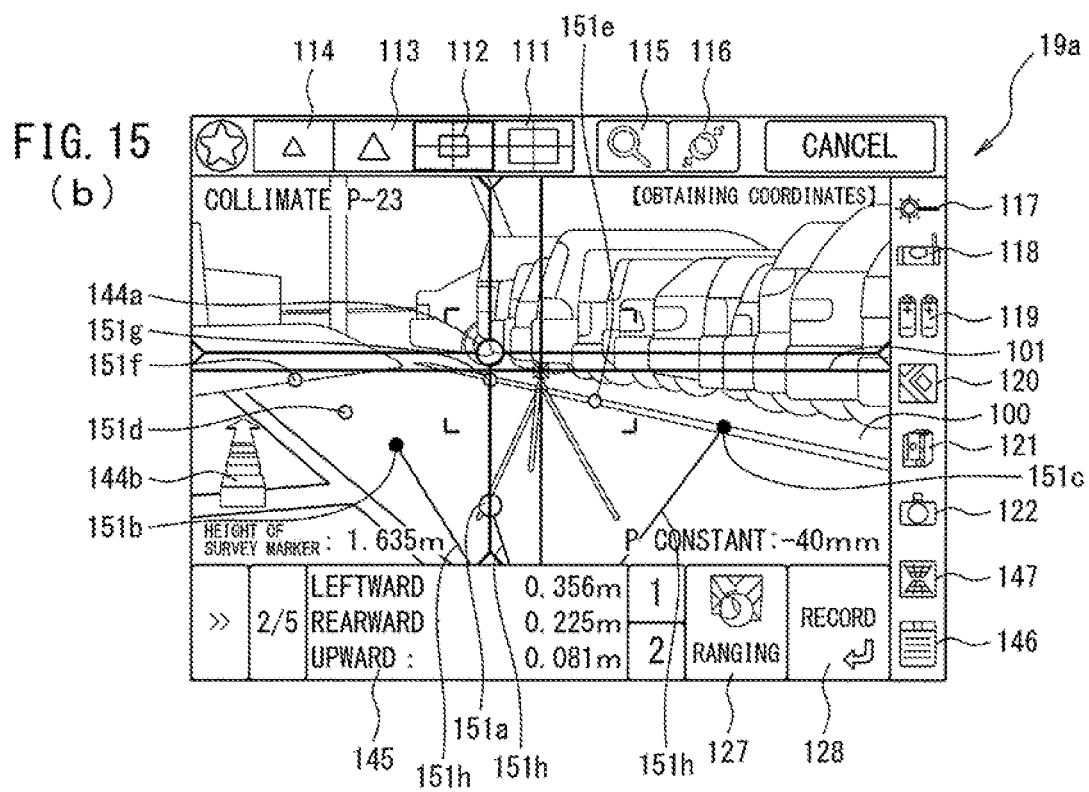
FIG. 15(a)
FIG. 15(b)

(a)

(b)

SURVEYING INSTRUMENT AND PROGRAM

TECHNICAL FIELD

The present invention relates to surveying instruments and programs.

BACKGROUND ART

It is known to provide a finishing stake as a virtual 3D visualized image 7 at a planned installation position P1 that is viewed through translucent 3D glasses 6 when an aiming mark 8 and a cross hairs 3A+ that is on a line of collimation 3A of a transit 3 are in perfect alignment by showing the aiming mark 8 within a left-eye image and a right-eye image that are required to create the virtual 3D visualized image 7 together with projecting the left-eye and right-eye images onto the 3D glasses 6 in order to let the user see the virtual 3D visualized image 7 on the 3D glasses 6. See, for example, Patent Literature 1.

PRIOR ART

Patent Literature

[Patent Literature 1] JP 2000-74664A

SUMMARY OF INVENTION

Technical Problem

However, according to the Patent Literature 1, there is a need for perfect alignment between the aiming mark 8 shown on left and right glasses of the 3D glasses and the line of collimation 3A of the transit 3.

Solution to Problem

A surveying instrument, according to the present invention, includes: a survey system configured to survey an object under survey; an image sensing system, to be pointed in a direction toward said object under survey, including a first image sensing unit having an angle of view and a second image sensing unit having an angle of view wider than the angle of view of said first image sensing unit; a horizontal angle driver configured to rotate said survey system and said image sensing system around a vertical axis of said surveying instrument; a vertical angle driver configured to rotate said survey system and said image sensing system around a horizontal axis of said surveying instrument; a data storage part configured to store design data; an angle detecting part configured to detect an angle of a collimation direction relative to a bearing; and a control unit configured to cause an image, which is based on image data that said first image sensing unit or said second image sensing unit generates after imaging, a design data object for showing the locations of that portion of said design data which is included in said image, and coordinate measurement point objects for showing the locations of coordinate measurement points, to be surveyed by said survey system, corresponding to that portion of said design data which is included in said image, to appear on a representation device in response to said design data stored in said data storage part and said angle detected by said angle detecting part.

BRIEF DESCRIPTION OF THE DRAWINGS

FIG. 10(*b*) illustrates one example of an observation screen appearing on the second representation device 19 according to the observation function.

FIG. 10(*c*) illustrates one example of an observation data record screen appearing on the second representation device 19 according to the observation function.

FIG. 10(*d*) illustrates one example of an observation screen appearing on the second representation device 19 according to the observation function.

FIG. 11(*b*) illustrates one example of a leveling screen appearing on the second representation device 19 according to the leveling function.

FIG. 12(*b*) illustrates one example of a photograph management screen appearing on the second representation device 19.

FIG. 13(*b*) illustrates one example of a photograph data screen appearing on the second representation device 19.

FIG. 13(*c*) illustrates one example of a photograph management screen appearing on the second representation device 19.

FIG. 14(*b*) illustrates one example of the coordinate measurement screen appearing on the second representation device 19 according to the coordinate measurement function.

FIG. 15(*a*) illustrates one example of a coordinate measurement screen appearing on the second representation device 19 according to the coordinate measurement function.

FIG. 15(*b*) illustrates one example of a coordinate measurement screen appearing on the second representation device 19 according to the coordinate measurement function.

DESCRIPTION OF THE EMBODIMENTS

The embodiments of the present invention will now be described with reference to the accompanying drawings.

Figure 1:
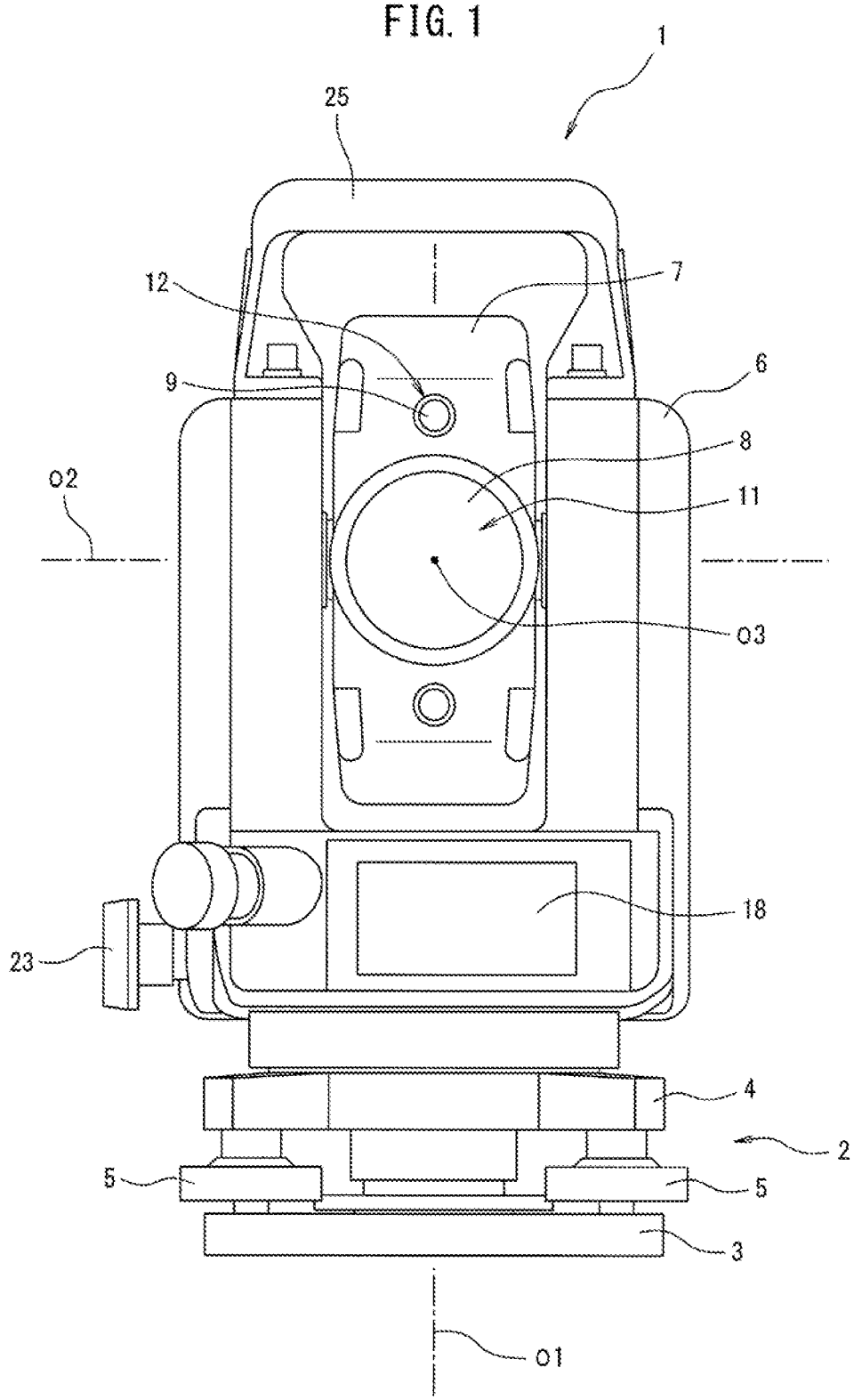
FIG. 1 illustrates a front view of a surveying instrument 1.
Figure 2:
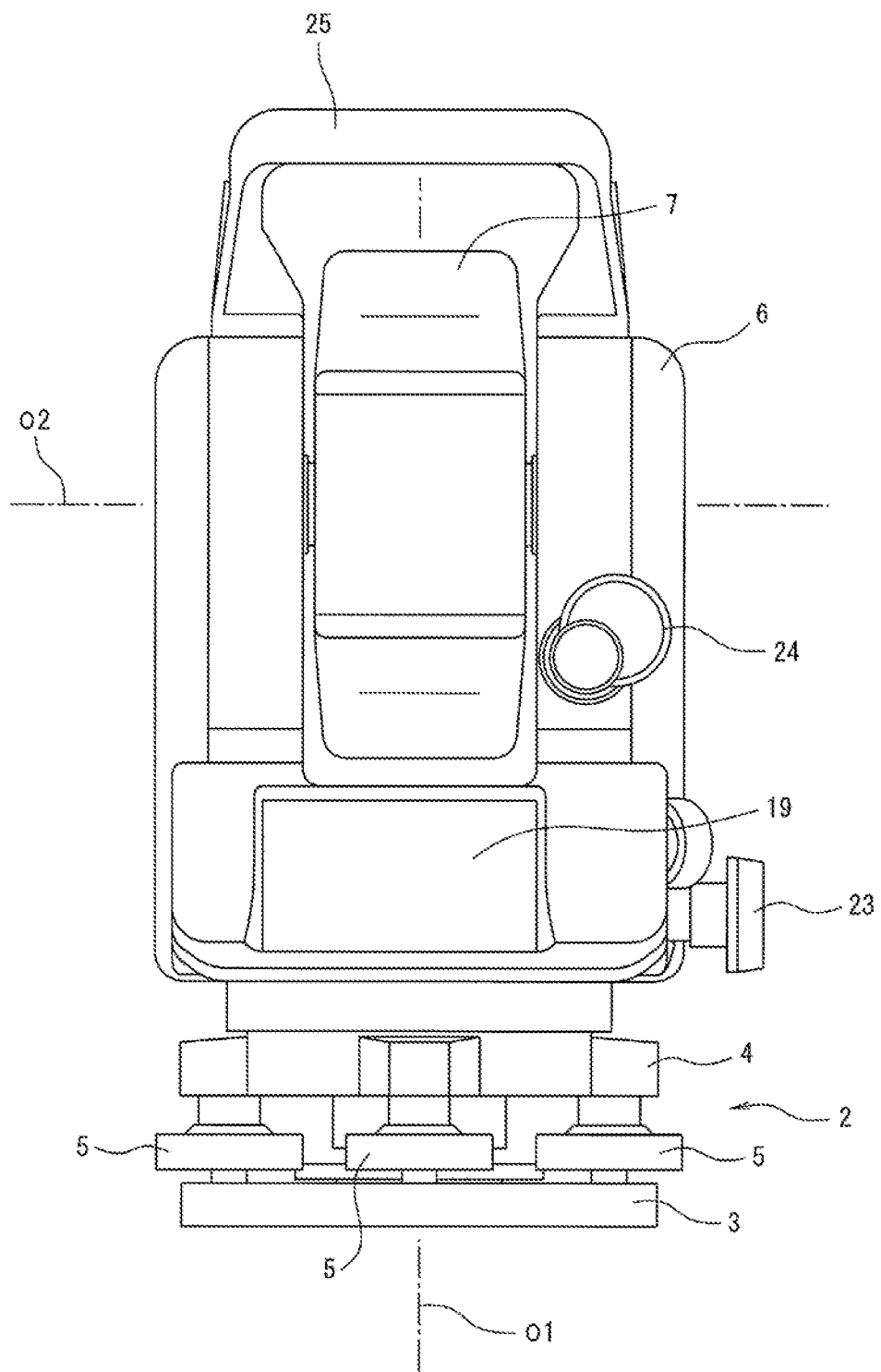
FIG. 2 illustrates a rear view of the surveying instrument 1.
Figure 3:
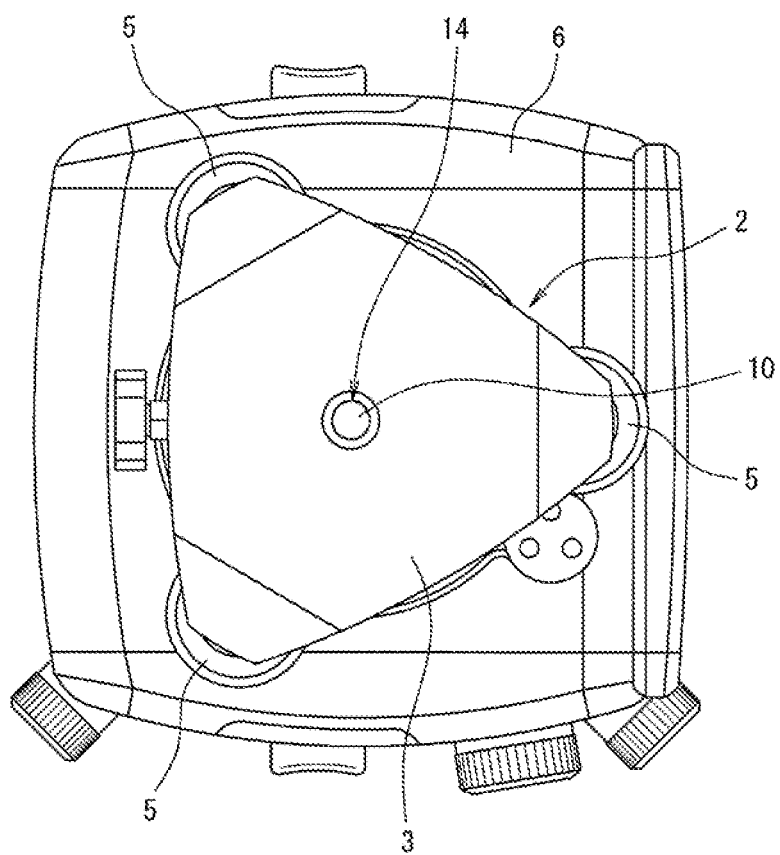
FIG. 3 illustrates a bottom view of the surveying instrument 1.

FIG. 1 illustrates a front view, i.e. a view looking from the front side, of a surveying instrument 1, which includes a surveying equipment and a surveying device. FIG. 2 is a rear view, i.e. a view looking from the rear side, of the surveying instrument 1. FIG. 3 is a bottom view of the surveying instrument 1.

Describing, as one example, the surveying instrument 1 is an instrument for surveying an object under survey. Describing, as one example, the surveying instrument 1 is an instrument for measuring angles with respect to the object under survey and distances to the object. Describing, as one example, the surveying instrument 1 is an instrument combining an electro-optical distance measuring instrument for distance measurement with a theodolite for angle measurement. Describing, as one example, the surveying instrument 1 is an instrument for simultaneously measuring angles with respect to the object under survey and distances to the object. Describing, as one example, the surveying instrument 1 is a total station (TS). Describing, as one example, the object under survey is a target like a prism, a mirror, a reference sheet, etc. The object under survey is sometimes called a signal target or a target. Describing, as one example, the surveying instrument 1 is an instrument for surveying a first target. Describing, as one example, the first target is a prism or a mirror or a reference sheet, etc.

The surveying instrument 1 includes a leveling system 2, a main unit 6 and an image sensing system 7. The leveling system 2 is, for example, a leveling stand. The leveling system 2 has a base plate 3, a mount 4 and level screws 5. The base plate 3 is a member that is fixed to a tripod, not shown. The base plate 3 is fixed to a head of the tripod by means of screws, etc. The mount 4 is configured such that the angle in degrees by which it tilts from the base plate 3 changes by means of the level screws 5. Attached to the mount 4 is the main unit 6. The angle in degrees by which a first axis O1 that is the vertical axis of the surveying instrument 1 tilts changes by means of the level screws 5.

Leveling is a process of making the vertical axis of the surveying instrument 1 vertical. Upon being leveled, the first axis O1 that is the vertical axis of the surveying instrument 1 is made in perfect alignment with the vertical direction, and a second axis O2 that is the horizontal axis of the surveying instrument 1 is made perpendicular to the vertical direction. Leveling can be expressed as leveling.

Plumbing is a process of making the vertical center of the surveying instrument 1 to coincide with the center of a target or survey mark. Plumbing means aligning the machine center line of the surveying instrument 1 with a vertical line for a survey point, such as, a survey reference position on the earth surface, a reference point, etc. Plumbing can be expressed as vertically aligning centers or vertically centering. When plumbing is carried out for the surveying instrument 1, the first axis O1, which is the vertical axis of the surveying instrument 1, passes through the center of a second target. The second target is a different target from a first target. Machine height measuring target is cited as an example of the second target.

The leveling system 2 rotatably supports the main unit 6 for rotation about the vertical axis. The main unit 6 is configured such that it is rotatable about the axis O1 relative to the leveling system 2. The main unit 6 is located above the leveling system 2. The main unit 6 rotatably supports the image sensing system 7 for rotation about a horizontal axis. Thus, the main unit 6 serves as a support. In addition, the main unit 6 serves as a bracket. The main unit 6 contains a first representation device 18, a second representation device 19, a horizontal angle operating part 23, a vertical angle operating part 24, a gripper 25, and a third image sensing unit 14.

The first representation device 18 includes a display 18a. The first representation device 18 has a representation function that shows images and objects on the display 18a. The first representation device 18 shows, for example, images based on image data which are generated by the image sensing system 7 and information based on observation data. A liquid crystal display is cited as an example of the first representation device 18. The first representation device 18 is located, for example, on the opposite side. The first representation device 18 is used, for example, for reverse observation.

Describing, as one example, the first representation device 18 has a touch screen to enable a user to interact with the surveying instrument 1 via the display 18a. Another example of the first representation device 18 has a capacitive touch screen. When a stylus pen or a finger of a user operates the display 18a, i.e. comes into contact with or touches the display 18a, the user can give an operating command, etc. to the surveying instrument 1. The first representation device 18 may have a resistive touch screen. The first representation device 18 is fixed to the main unit 6 or it is movable on the main unit 6. A tilting representation device is cited as an example of the first representation device 18 movable on the main unit 6. The first representation device 18 is, for example, rotatable about a horizontal axis.

The second representation device 19 includes a display 19a. The second representation device 19 has a representation function that shows images and objects on the display 19a. The second representation device 19 shows, for example, images based on image data which are created by the image sensing system 7 and information based on observation data. A liquid crystal display is cited as an example of the second representation device 19. The second representation device 19 is located, for example, on the opposite side with respect to the location of the first representation device 18. The second representation device 19 is different from the first representation device 18 in that, for example, the displays 19a and 18a face different directions. The display 19a of the second representation device 19 faces a direction which is opposite to a direction the display 18a of the first representation device 18 faces. The second representation device 19 is located, for example, on the normal side. The second representation device 19 is used, for example, for normal observation.

One of examples of the second representation device 19 has a touch screen to enable a user to interact with the surveying instrument 1 via the display 19a. Another example of the second representation device 19 has a capacitive touch screen. When a stylus pen or a finger of a user operates the display 19a, i.e. comes into contact with or touches the display 19a, the user can give an operating command, etc. to the surveying instrument 1. The second representation device 19 may have a resistive touch screen. The second representation device 19 is fixed to the main unit 6 or it is movable on the main unit 6. A tilting representation device is cited as an example of the second representation device 19 movable on the main unit 6. The second representation device 19 is, for example, rotatable about a horizontal axis.

The horizontal angle operating part 23 is operable by a user to horizontally turn the image sensing system 7.

The vertical angle operating part 24 is operable by the user to vertically turn the image sensing system 7.

The gripper 25 is a tool to be gripped by the user for carrying, for example, the surveying instrument 1. One of examples of the gripper 25 is a carrying handle. The gripper 25 is fixed to, for example, an upper surface of the main unit 6. The gripper 25 can store a stylus pen which is used by the user for operating the first and second representation devices 18 and 19.

The third image sensing unit 14 includes a third optical system which includes a third objective lens 10 and a third image sensor. The third optical system guides light emanating from the second target to the third image sensor. The third image sensor takes an image of the second target to generate image data. The third image sensing unit 14 takes an image of a part below the surveying instrument 1 to generate image data. The third image sensing unit 14 takes an image of a part below and including the first axis O1 which is the vertical axis of the surveying instrument 1 to generate image data. One of examples of the third image sensor includes a CCD or a CMOS. The image data generated by the third image sensing unit 14 are provided to a control unit 40. One of examples of the third image sensing unit 14 is a unit for generating image data to show image below the surveying instrument 1 within the first representation device 18 and/or the second representation device 19 when a user levels or plumbs the surveying instrument 1. The third image sensing unit 14 is fixed to the main unit 6. Another example of the third image sensing unit 14 is a plumbing camera. Still another example of the third image sensing unit 14 is a plumbing telescope.

The main unit 6 rotatably supports the image sensing system 7 for rotation about a horizontal axis. The image sensing system 7 is rotatable relative to the main unit 6 about the second axis O2 which is the horizontal axis. The image sensing system 7 is rotatable relative to the leveling system 2 about the first axis O1 which is the vertical axis. The image sensing system 7 is rotatable about the first axis O1 which is the vertical axis of the surveying instrument 1 and it is rotatable about the second axis O2 which is the horizontal axis of the surveying instrument 1.

The image sensing system 7 is configured to be horizontally rotatable in response to a manipulative variable of a fine horizontal angle adjustment knob 23 which is manipulated by a user. The image sensing system 7 is configured to be vertically rotatable in response to a manipulative variable of a fine vertical angle adjustment knob 24 which is manipulated by the user.

The image sensing system 7 has a first image sensing unit 11 and a second image sensing unit 12.

The first image sensing unit 11 includes a first optical system which includes a first objective lens 8 and a first image sensor. The first optical system guides light emanating from the first target to the first image sensor. The first image sensor takes an image of the first target to generate image data. Describing, as one example, the first image sensor includes a CCD or a CMOS. The image data generated by the first image sensing unit 11 are provided to the control unit 40. Describing, as one example, the first image sensing unit 11 is a unit for generating image data to show an image having vision including the first target within the first representation device 18 and/or the second representation device 19 when it is pointed in a direction toward the first target. Describing, as one example, the first image sensing unit 11 is a telephotographic camera. Describing, as one example, the first image sensing unit 11 is a collimation camera. Describing, as one example, the first image sensing unit 11 is a collimation telescope. A visual field which the first image sensing unit 11 images is different from a visual field which the third image sensing unit 14 images. The visual field covered by the first image sensing unit 11 does not overlap the visual field covered by the third image sensing unit 14.

The second image sensing unit 12 includes a second optical system which includes a second objective lens 9 and a second image sensor. The second optical system guides light emanating from the first target to the second image sensor. The second objective lens 9 is separately provided from the first objective lens 8. Describing, as one example, the second objective lens 9 is located on the same face as that the first objective lens 8 is located on in the image sensing system 7. Describing, as one example, the second objective lens 9 and the first objective lens 8 are arranged in tandem in vertical direction. Describing, as one example, an optical axis of the second objective lens 9 is nearly parallel to an optical axis of the first objective lens 8. The second image sensor takes an image of the first target to generate image data. The second image sensor is separately provided from the first image sensor. Describing, as one example, the second image sensor includes a CCD or a CMOS. The image data generated by the second image sensing unit 12 are provided to the control unit 40. An angle of view that the second image sensing unit 12 has is wider than an angle of view that the first image sensing unit 11 has. The angle of view of the first image sensing unit 11 is narrower than the angle of view of the second image sensing unit 12. A viewing angle of the second image sensing unit 12 is wider than a viewing angle of the first image sensing unit 11. The viewing angle of the first image sensing unit 11 is narrower than the viewing angle of the second image sensing unit 12. Describing, as one example, the second image sensing unit 12 is a unit for generating image data to show an image having a second view wider than a first view and including the first target within the first representation device 18 and/or the second representation device 19 when it is pointed in a direction toward the first target. Describing, as one example, the second image sensing unit 12 is a wide-angle camera. Describing, as one example, the second image sensing unit 12 is a wide-angle telescope. A visual field which the second image sensing unit 12 images is different from a visual field which the third image sensing unit 14 images. The visual field covered by the second image sensing unit 12 does not overlap the visual field covered by the third image sensing unit 14.

Pointing the surveying instrument 1 in a direction toward a target is a process of aligning the line of collimation with the center of the target by directing an objective lens toward the target. The line of collimation is an imaginary straight line that passes though the optical center of the objective lens and perpendicularly intersects the horizontal axis of the surveying instrument 1. The line of collimation is an imaginary straight line that passes through the optical center of the first objective lens 8 of the first image sensing unit 11 and perpendicularly intersects the second axis O2 that is the horizontal axis of the surveying instrument 1. A line of collimation is an imaginary straight line that passes through the center of an objective lens of a theodolite and perpendicularly intersects the horizontal axis of the theodolite. The line of collimation is an imaginary straight line that passes through the center of the first objective lens 8 of the first image sensing unit 11 and perpendicularly intersects the second axis O2 that is the horizontal axis of the surveying instrument 1. The line of collimation is matched with the optical axis of the first objective lens 8. Pointing the surveying instrument 1 in a direction toward the first target corresponds to aligning a third axis O3 that is the line of collimation with the center of the first target by directing the first objective lens 8 toward the first target. On the line of collimation, a direction from the inside of the surveying instrument 1 toward the outside of the surveying instrument 1 is sometimes referred to as a collimation direction.

Figure 4:
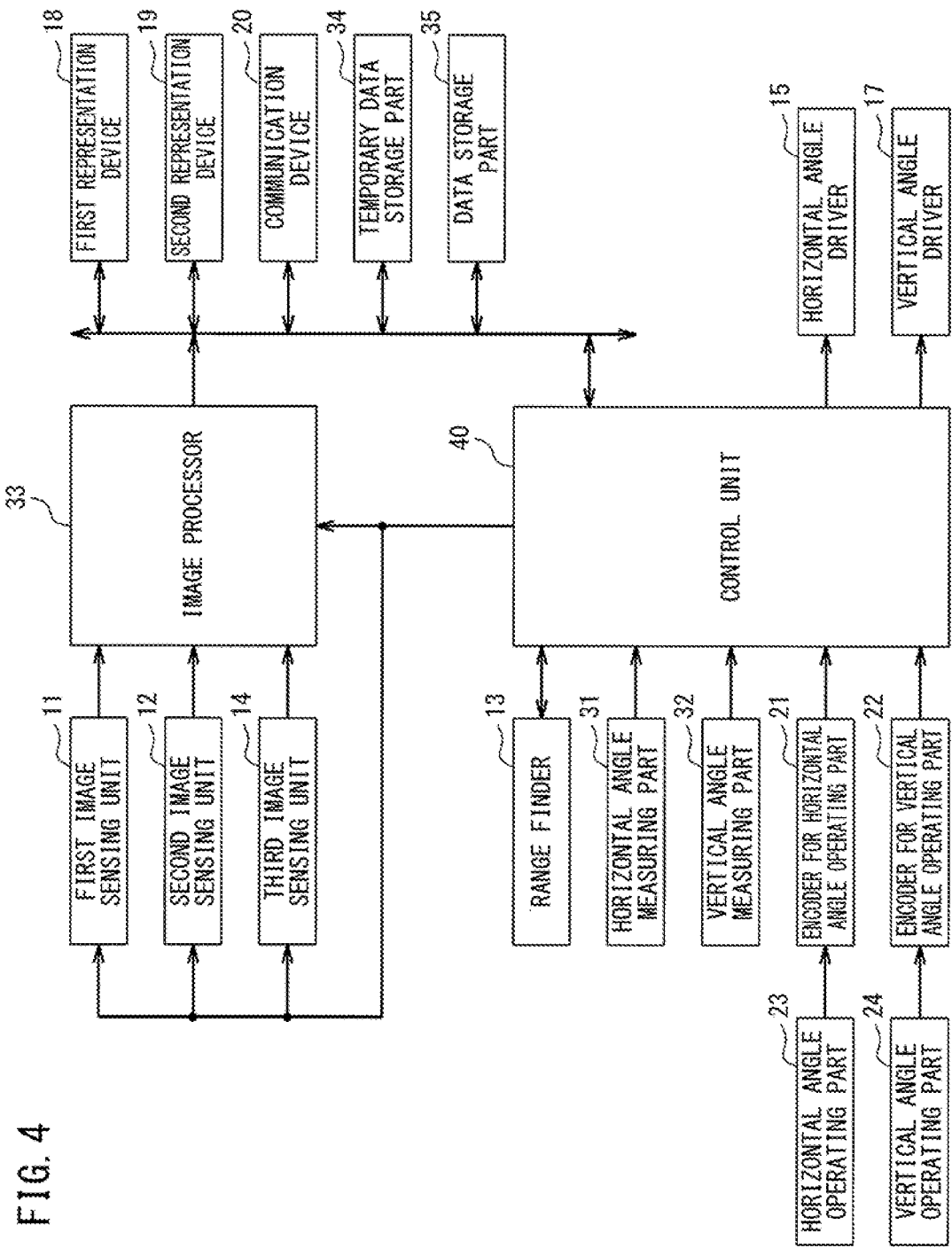
FIG. 4 illustrates a system configuration of the surveying instrument 1.

FIG. 4 shows a system configuration of the surveying instrument 1. The surveying instrument 1 includes: the image sensing system 7, which has the first image sensing unit 11, the second image sensing unit 12 and the third image sensing unit 14; a range finder 13; a horizontal angle driver 15; a vertical angle driver 17; the first representation device 18; the second representation device 19; a communication device 20; an encoder for horizontal angle operating part 21; an encoder for vertical angle operating part 22; a horizontal angle operating part 23; a vertical angle operating part 24; a horizontal angle measuring part 31; a vertical angle measuring part 32; an image processor 33; a temporary data storage part 34; a data storage part 35; a control unit 40; and a power supply (not illustrated).

The first image sensing unit 11 provides, as an output, image data that are produced after performing imaging under imaging conditions (i.e. gain, storage time corresponding to shutter speed, etc.) set by the control unit 40 to the image processor 33. In the first image sensing unit 11, optimum exposure is automatically set by the control unit 40 to optimize a luminance of an image based on the image data produced after performing imaging. In the first image sensing unit 11, an automatic exposure (AE; Auto Exposure) function is executed by the control unit 40. A first optical system in the first image sensing unit 11 is configured such that a focus lens driver makes it possible to change the position of a focus lens in directions along the optical axis in response to a focusing instruction by the control unit 40.

The second image sensing unit 12 provides, as an output, image data that are produced after performing imaging under imaging conditions (i.e. gain, storage time corresponding to shutter speed, etc.) set by the control unit 40 to the image processor 33. In the second image sensing unit 12, optimum exposure is automatically set by the control unit 40 to optimize a luminance of a second image based on the image data produced after performing imaging. In the second image sensing unit 12, an automatic exposure (AE; Auto Exposure) function is executed by the control unit 40.

The third image sensing unit 14 sends, as an output, third image data that are produced after performing imaging under imaging conditions (i.e. gain, storage time corresponding to shutter speed, etc.) set by the control unit 40 to the image processor 33.

The image processor 33 performs image processing of the image data, which are provided by the first, second and third image sensing units 11, 12 and 13. The image data, which are processed by the image processor 33, are stored in the temporary data storage part 34. The first, second and third image sensing units 11, 12 and 13 continuously perform imaging, for example, during live view operation, to provide image data in a sequential order. The image data sequentially provided are sequentially stored in the temporary data storage part 34.

The temporary data storage part 34 temporarily stores the image data. One of examples of the temporary data storage part 34 is a volatile memory. Another example of the temporary data storage part 34 is a RAM (Random Access Memory).

Examples of the image processing performed by the image processor 33 are: processing for generating image data for representation; processing for generating compressed image data; processing for generating image data for recording; processing for cropping a portion of an image based on image data and electronically enlarging the portion of the image (digital zoom); etc.

Under the control unit 40, the representation image data, which are generated by the image processor 33, appear on the first representation device 18 and the second representation device 19. The surveying instrument 1 may or may not include an eye-piece optical system for collimation and/or an eye-piece optical system for plumbing.

The image data for recording, which are generated by the image processor 33, is recorded in an external memory via the communication device 20. One of examples of the external memory is a non-volatile memory. Another example of the external memory is a flash memory or a hard disk drive.

Describing, as one example, the range finder 13 is in the form of an electronic distance meter that includes a light emitting element, a dichroic mirror and a light receiving element. Describing, as one example, the light emitting element is a laser diode that includes a pulsed laser diode, etc. or a light emitting diode that includes an infrared light emitting diode, etc. Describing, as one example, the range finder 13 transmits a distance measuring light, emitted by the light emitting element and reflected by the dichroic mirror, as a beam of light coaxial with the first objective lens 8, toward an object under survey or target, i.e. a reflector or prism. The light reflected by the object under survey returns to the first objective lens 8 again, the reflected light is separated from the distance measuring light by the dichroic mirror and enters the light receiving element. A distance to the object under survey is calculated from a time lag between a reference light, from the light emitting element, incident, through the inside the surveying instrument 1, upon the light receiving element and the distance measuring light from the object under survey.

The horizontal angle measuring part 31 detects the angle of rotation by which the third axis O3, which is the line of collimation, is horizontally rotated, i.e. the angle of rotation by which the line of collimation is rotated about the first axis O1. The horizontal angle measuring part 31 feeds, as an output, a signal corresponding to the detected angle of rotation to the control unit 40. One of examples of the horizontal angle measuring part 31 includes an encoder. Another example of the horizontal angle measuring part 31 includes an optical absolute encoder. The horizontal angle measuring part 31 is a part of an angle detecting part.

The vertical angle measuring part 32 detects the angle of rotation by which the third axis O3, which is the line of collimation, is vertically rotated (or rotated in a vertical direction), i.e. the angle of rotation by which the line of collimation is rotated about the second axis O2. The vertical angle measuring part 32 feeds, as an output, a signal corresponding to the detected angle of rotation to the control unit 40. One of examples of the vertical angle measuring part 32 includes an encoder. Another example of the vertical angle measuring part 32 includes an optical absolute encoder. The horizontal angle measuring part 32 is a part of the angle detecting part.

The encoder for horizontal angle operating part 21 detects the angle of rotation entered by the horizontal angle operating part 23. The encoder for horizontal angle operating part 21 feeds, as an output, a signal corresponding to the detected angle of rotation to the control unit 40.

The horizontal angle driver 15 rotates the main unit 6, relative to the leveling system 2, around the first axis O1, which is the vertical axis of the surveying instrument 1. Rotating the main unit 6 relative to the leveling system 2 around the first axis O1 which is the vertical axis of the surveying instrument 1 by the horizontal angle driver 15 causes the image sensing system 7 to rotate relative to the leveling system 2 around the first axis O1 which is the vertical axis of the surveying instrument 1. The horizontal angle driver 15 rotates the main unit 6, relative to the leveling system 2, around the first axis O1, which is the vertical axis of the surveying instrument 1 in response to control of the control unit 40. Rotating the main unit 6 relative to the leveling system 2 around the first axis O1 which is the vertical axis of the surveying instrument 1 by the horizontal angle driver 15 in response to the control of the control unit 40 causes the image sensing system 7 to rotate relative to the leveling system 2 around the first axis O1 which is the vertical axis of the surveying instrument 1. One example of the horizontal angle driver 15 includes a motor.

Describing, as one example, the horizontal angle driver 15 rotates the main unit 6, relative to the leveling system 2, around the first axis O1, which is the vertical axis of the surveying instrument 1 when the first representation device 18 is operated by the user. Describing, as another example, the horizontal angle driver 15 rotates the main unit 6 relative to the leveling system 2 around the first axis O1 which is the vertical axis of the surveying instrument 1 in response to the amount of rotation that the control unit 40 determines based on the location on the display 18*a* tapped by the user.

Describing, as one example, the horizontal angle driver 15 rotates the main unit 6, relative to the leveling system 2, around the first axis O1, which is the vertical axis of the surveying instrument 1 when the second representation device 19 is operated by the user. Describing, as another example, the horizontal angle driver 15 rotates the main unit 6 relative to the leveling system 2 around the first axis O1 which is the vertical axis of the surveying instrument 1 in response to the amount of rotation that the control unit 40 determines based on the location on the display 19*a* tapped by the user.

Describing, as one example, the horizontal angle driver 15 rotates the main unit 6, relative to the leveling system 2, around the first axis O1, which is the vertical axis of the surveying instrument 1 when a rotary-drive instruction is entered from a remote controller which is one of external equipment. Describing, as another example, the horizontal angle driver 15 rotates the main unit 6 relative to the leveling system 2 around the first axis O1 which is the vertical axis of the surveying instrument 1 in response to the amount of rotation that the control unit 40 determines based on the entered rotary-drive instruction from the remote controller.

Describing, as one example, the horizontal angle driver 15 rotates the main unit 6, relative to the leveling system 2, around the first axis O1, which is the vertical axis of the surveying instrument 1 when the horizontal angle operating part 23 is operated.

The encoder for vertical angle operating part 22 detects the angle of rotation entered by the vertical angle operating part 24. The encoder for vertical angle operating part 22 feeds, as an output, a signal corresponding to the detected angle of rotation to the control unit 40.

The vertical angle driver 17 rotates the image sensing system 7, relative to the main unit 6, around the second axis O2, which is the horizontal axis of the surveying instrument 1. The vertical angle driver 17 rotates the image sensing system 7 relative to the main unit 6 around the second axis O2 which is the horizontal axis of the surveying instrument 1 in response to control of the control unit 40. One example of the vertical angle driver 17 includes a motor.

Describing, as one example, the vertical angle driver 17 rotates the image sensing system 7, relative to the main unit 6, around the second axis O2, which is the horizontal axis of the surveying instrument 1 when the first representation device 18 is operated by the user. Describing, as another example, the vertical angle driver 17 rotates the image sensing system 7 relative to the main unit 6 around the second axis O2 which is the horizontal axis of the surveying instrument 1 in response to the amount of rotation that the control unit 40 determines based on the location on the display 18*a* tapped by the user.

Describing, as one example, the vertical angle driver 17 rotates the image sensing system 7, relative to the main unit 6, around the second axis O2, which is the horizontal axis of the surveying instrument 1 when the second representation device 19 is operated by the user. Describing, as another example, the vertical angle driver 17 rotates the image sensing system 7 relative to the main unit 6 around the second axis O2 which is the horizontal axis of the surveying instrument 1 in response to the amount of rotation that the control unit 40 determines based on the location on the display 19*a* tapped by the user.

Describing, as one example, the vertical angle driver 17 rotates the image sensing system 7, relative to the main unit 6, around the second axis O2, which is the horizontal axis of the surveying instrument 1 when a rotary-drive instruction is entered from a remote controller which is one of external equipment. Describing, as another example, the vertical angle driver 17 rotates the image sensing system 7 relative to the main unit 6 around the second axis O2 which is the horizontal axis of the surveying instrument 1 in response to the amount of rotation that the control unit 40 determines based on the entered rotary-drive instruction from the remote controller.

Describing, as one example, the vertical angle driver 17 rotates the image sensing system 7, relative to the main unit 6, around the second axis O2, which is the horizontal axis of the surveying instrument 1 when the vertical angle operating part 24 is operated.

The communication device 20 communicates with the external equipment. The communication device 20 is an interface for inputting and outputting data to and from the external equipment. An USB (Universal Serial Bus) interface for communication and a Bluetooth interface for radio communication can be considered as examples of the communication device 20.

The data storage part 35 stores programs, parameters, etc. required for operation of the surveying instrument 1 and underlying design data, etc. for works. One of examples of the data storage part 35 is a non-volatile memory. Another example of the data storage part 35 is a ROM (Read Only Memory). Describing, as one example, the data storage part 35 stores programs, parameters, etc. to keep the programs, parameters, etc. even when the surveying instrument 1 is out of operation.

The control unit 40 controls the entire surveying instrument 1. Describing, as one example, observation function, such as, a fundamental observation, a finished-work observation, etc., and a coordinate measurement function can be considered as functions executable by the surveying instrument 1 based on control from the control unit 40. The fundamental observation function is a function of carrying out ranging and angle measuring of an object under survey or target. The finished-work observation function is a function of surveying a portion in which executing construction work is completed. The coordinate measurement function is a function of setting survey stakes for restoration of reference points on buildings, road centerlines, top of slope on site, and toe of slope on site.

The control unit 40 causes the observation information, which is based on at least one of the image based on the image data that the first image sensing unit 11 generates after imaging, the image based on the image data that the second image sensing unit 12 generates after imaging, the horizontal angle data that the horizontal angle measuring part 31 obtains after angle measurement, the vertical angle data the vertical angle measuring part 32 obtains after angle measurement, and the ranging data that the range finder 13 obtains after ranging, to appear on the first representation device 18 and/or the second representation device 19.

The power supply 41 delivers enough power to operate the surveying instrument 1. One of examples of the power supply 41 is a secondary battery like a nickel-hydrogen battery, lithium-ion battery, etc.

Figure 5:
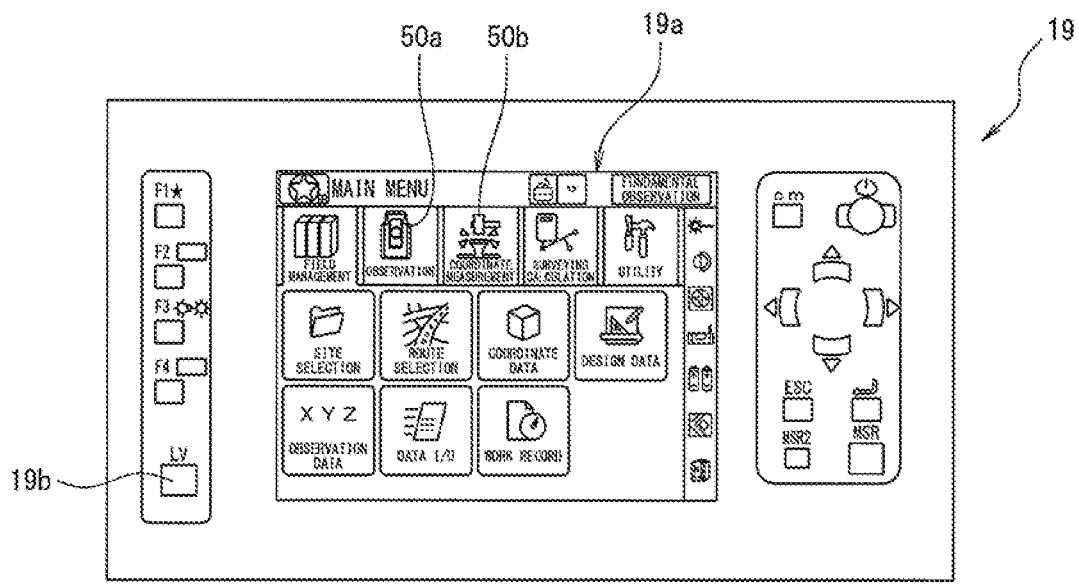
FIG. 5 illustrates one example of a main menu screen appearing on a second representation device 19.

FIG. 5 illustrates one example of the second representation device 19 showing a main menu screen. The second representation device 19 includes the display 19a and a live view button 19b.

Describing, as one example, the main menu screen illustrated in FIG. 5 appears when the surveying instrument 1 is started by, for example, operating a power switch to ON. The main menu screen illustrated in FIG. 5 includes an observation function object 50a and a coordinate measurement function object 50b.

The observation function object 50a is a function of showing the user the location which receives the user operation to execute observation function. The control unit 40 causes an observation screen shown, for example, in FIG. 6 to appear on the second representation device 19 upon determination that the user has tapped the display 19a at the location where the observation function object 50a is shown.

The coordinate determination function object 50b is a function of showing the user the location which receives the user operation to execute coordinate measurement function. The control unit 40 causes a coordinate measurement screen shown, for example, in FIG. 14(a) to appear on the second representation device 19 upon determination that the user has tapped the display 19a at the location where the coordinate measurement function object 50b is shown.

Figure 6:
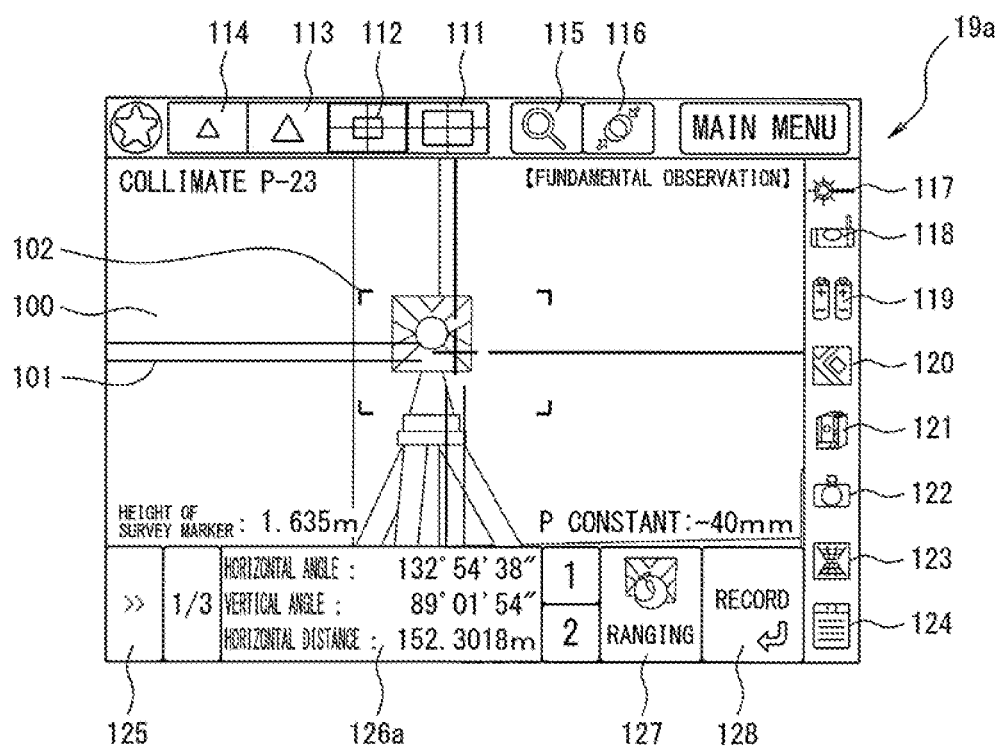
FIG. 6 illustrates one example of an observation screen appearing on the second representation device 19 according to an observation function.

The observation function is described. FIG. 6 illustrates one example of the observation screen that appears on the second representation device 19. Describing, as one example, the observation screen illustrated in FIG. 6 appears on the second representation device 19 upon the control unit 40 determining that the user has tapped the display 19a at the location where the observation function object 50a is shown when the main menu screen illustrated in FIG. 5 appears on the second representation device 19.

In FIG. 6, the state where the observation screen, which includes an image object 100 of an image based on image data that the first image sensing unit 11 or the second image sensing unit 12 generates after imaging, a reticle object 101 indicative of a reticle, an object 102 indicative of an angle of view after changing angle of view, and an object 110 for touch interactions, appears on the second representation device 19 is indicated as an example.

The first object 110 includes a first angle of view selecting object 111, a second angle of view selecting object 112, a third angle of view selecting object 113, a fourth angle of view selecting object 114, a target searching object 115, an AF object 116, a laser pointer object 117, an bubble tube showing object 118, a battery showing object 119, a map showing object 120, an instrument installing object 121, a photographic screen switching object 122, an AR representation screen switching object 123, a text representation screen switching object 124, a function switching object 125, an observation, input and setup object 126, a range finding object 127, and a record object 128.

The first angle of view selecting object 111 is an object for showing the user the location which receives the user operation to cause the image having the first angle of view, which is based on the image data that the first image sensing unit 11 generates after imaging, to appear on the second representation device 19 as the object 100.

The control unit 40 causes the image having the first angle of view, which is based on the image data that the first image sensing unit 11 generates after imaging, to appear on the second representation device 19 as the object 100 upon determination that the user has tapped the display 19a at the location where the first angle of view selecting object 111 is shown.

The second angle of view selecting object 112 is an object for showing the user the location which receives the user operation to cause the image having the second angle of view wider than the first angle of view, which is based on the image data that the first image sensing unit 11 generates after imaging, to appear on the second representation device 19 as the object 100. The control unit 40 causes the image having the second angle of view wider than the first angle of view, which is based on the image data that the first image sensing unit 11 generates after imaging, to appear on the second representation device 19 as the object 100 upon determination that the user has tapped the display 19a at the location where the second angle of view selecting object 112 is shown.

The third angle of view selecting object 113 is an object for showing the user the location which receives the user operation to cause the image having the third angle of view wider than the second angle of view, which is based on the image data that the second image sensing unit 12 generates after imaging, to appear on the second representation device 19 as the object 100. The control unit 40 causes the image having the third angle of view wider than second angle of view, which is based on the image data that the second image sensing unit 12 generates after imaging, to appear on the second representation device 19 as the object 100 upon determination that the user has tapped the display 19a at the location where the third angle of view selecting object 113 is shown.

The fourth angle of view selecting object 114 is an object for showing the user the location which receives the user operation to cause the image having the fourth angle of view wider than the third angle of view, which is based on the image data that the second image sensing unit 12 generates after imaging, to appear on the second representation device 19 as the object 100. The control unit 40 causes the image having the fourth angle of view wider than the third angle of view, which is based on the image data that the second image sensing unit 12 generates after imaging, to appear on the second representation device 19 as the object 100 upon determination that the user has tapped the display 19a at the location where the fourth angle of view selecting object 114 is shown.

Among the first angle of view selecting object 111, the second angle of view selecting object 112, the third angle of view selecting object 113 and the fourth angle of view selecting object 114, that one object which receives user operation appears on the second representation device 19 in a distinguishable manner from the other objects not receiving user operation. One example is to cause that one object which receives user operation among the first angle of view selecting object 111, the second angle of view selecting object 112, the third angle of view selecting object 113 and the fourth angle of view selecting object 114 to appear on the second representation device in a predetermined color or as being surrounded by a frame. In FIG. 6, the state where the third angle of view selecting object 113 receives user operation is illustrated. In FIG. 6, the image having the third angle of view, which is based on the image data that the second image sensing unit 12 generates after imaging, appears on the second representation device 19.

The control unit 40 may cause the image based on the image data that the second image sensing unit 12 generates after imaging to appear on the second representation device 19 together with the image based on the image data that the first image sensing unit 11 generates after imaging.

Figure 17A:
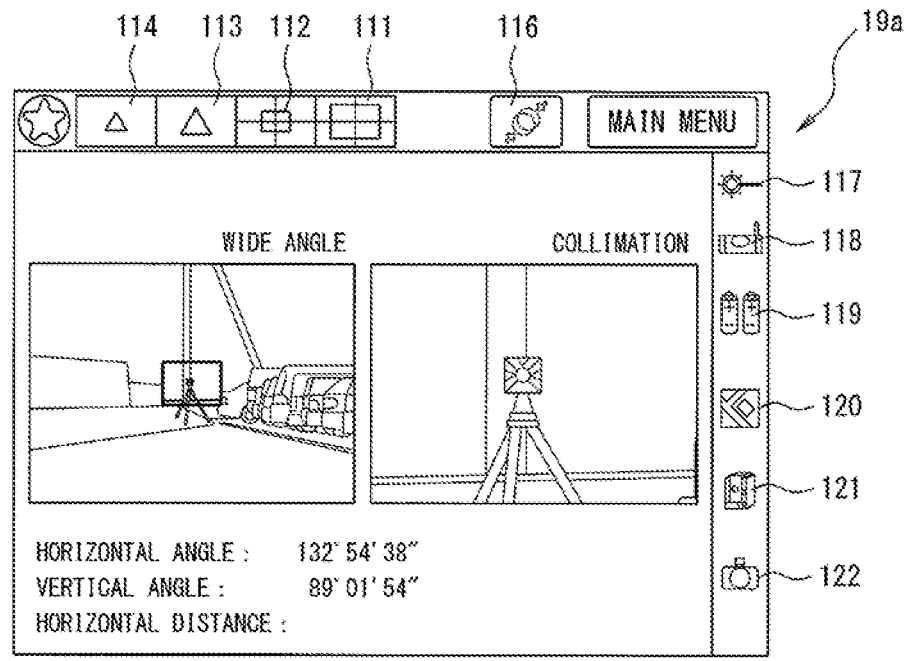
FIG. 17(a) illustrates one example of an observation screen appearing on the second representation device 19 according to an observation function.
Figure 17B:
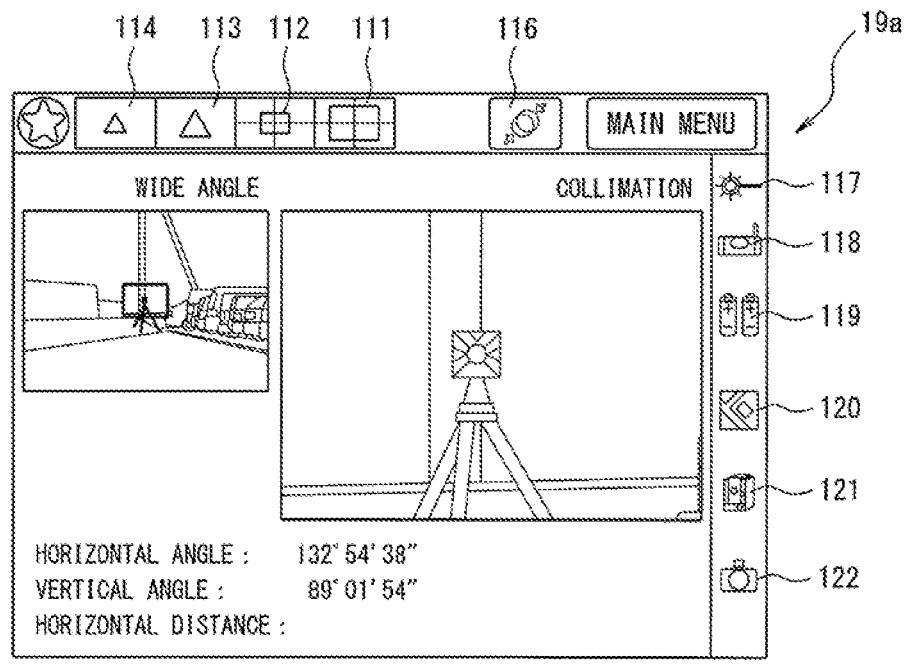
FIG. 17(b) illustrates one example of an observation screen appearing on the second representation device 19 according to the observation function.

One example is to cause the image based on the image data that the second image sensing unit 12 generates after imaging and the image based on the image data that the first image sensing unit 11 generates after imaging to appear side by side on the second representation device 19 as seen in observation screens illustrated in FIGS. 17(a) and 17(b). In the observation screen illustrated in FIG. 17(a), the image based on the image data that the second image sensing unit 12 generates after imaging and the image based on the image data that the first image sensing unit 11 generates after imaging are of similar size. In the observation screen illustrated in FIG. 17(b), the size of the image based on the image data that the first image sensing unit 11 generates after imaging is larger than the size of the image based on the image data that the second image sensing unit 12 generates after imaging.

Describing, as one example, the control unit 40 may cause the image based on the image data that the first image sensing unit 11 generates after imaging and the image based on the image data that the second image sensing unit 12 generates after imaging to appear on the second representation device 19 in the form of partially superimposing one on the other.

Describing, as one example, the control unit 40 may cause the image based on the image data that the first image sensing unit 11 generates after imaging and the image based on the image data that the second image sensing unit 12 generates after imaging to appear on the second representation device 19 in the form of picture-in-picture or completely superimposing one on the other.

The forms of representing the image based on the image data that the first image sensing unit 11 generates after imaging and the image based on the image data that the second image sensing unit 12 generates after imaging may be also applicable to observation screens which are shown, for example, in FIGS. 6 to 10, a photographic screen which is later described and illustrated in FIG. 12(a), coordinate measurement screens which are later described and illustrated in FIGS. 14(a), 15(a) and 15(b), etc.

Upon determination that the user has tapped to select any one of plural partitions set for the image, which is based on the image data that the first or second image sensing unit 11 or 12 generates after imaging, the control unit 40 may magnify the image within the selected partition to cause the magnified image to appear on the second representation device 19.

Figure 18:
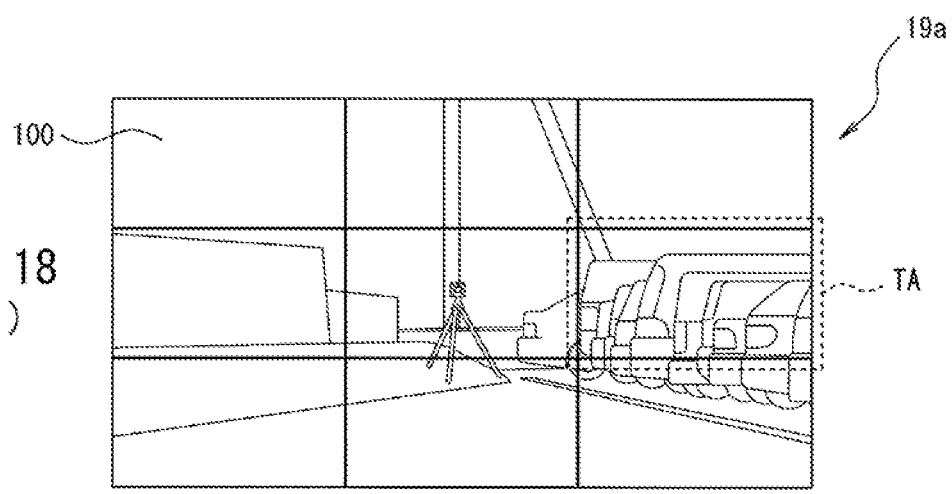
FIG. 18(a) illustrates one example of an observation screen appearing on the second representation device 19 according to the observation function.
FIG. 18(b) illustrates one example of an observation screen appearing on the second representation device 19 according to the observation function.
Figure 18:
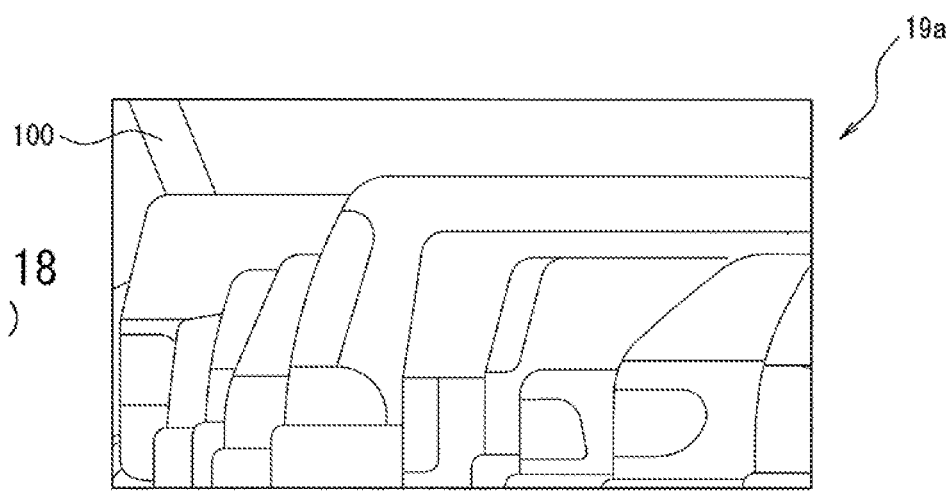

Description progresses with reference to FIGS. 18(a) and 18(b) as an example. For convenience of description, only the object 100 on the observation screen shown, for example, in FIG. 6 appears in FIGS. 18(a) and 18(b). In FIG. 18(a), the image, which is based on the image data that the first or second image sensing unit 11 or 12 generates after imaging, is divided into nine partitions in a 3×3 grid. Describing, as one example, upon determination that, with the screen illustrated in FIG. 18(a) appearing on the second representation device 19, the user has tapped the display 19a at the location where the partition TA is shown, the control unit 40 causes the image corresponding to the partition TA to appear, as the object 100, on the second representation device 19 as illustrated in FIG. 18(b).

When the image is magnified for representation, the control unit 40 may electronically or optically perform such magnification. When optically performing the magnification, the control unit 40 causes the horizontal angle driver 15 and the vertical angle driver 17 to rotatably move the image sensing system 7 so as to collimate the center of the selected partition by the user, causes the image sensing system 7 to switch from the second image sensing unit 12 to the first image sensing unit 11 and causes the image based on the image data that the first image sensing unit 11 generates after imaging to appear, as the object 100, on the second representation device 19.

The magnification of the image in the selected partition by the user for representation may be also applicable to the observation screen shown, for example, in FIG. 6, the photographic screen later described and illustrated in FIG. 12(a), the coordinate measurement screens later described and illustrated in FIGS. 14(a), 15(a) and 15(b), etc.

When switching from causing the image, which is based on the image data that the second image sensing unit 12 generates after imaging, to appear on the second representation device 19 to causing the image, which is based on the image data that the first image sensing unit 11 generates after imaging, to appear on the second representation device 19, the control unit 40 causes the image, which is based on the image data that the first image sensing unit 11 generates after imaging, to appear on the second representation device 19 after setting imaging conditions (exposure factors like storage time corresponding to shutter speed, gain etc.) for the first image sensing unit 11 based on the imaging conditions (exposure factors like storage time corresponding to shutter speed, gain etc.) when a proper exposure is obtained by an automatic exposure at the second image sensing unit 12. Describing, as one example, the data storage part 35 stores a table that correlates varying degrees of luminance with different combinations of storage time and gain at the first image sensing unit 11 to varying degrees of luminance with different combinations of storage time and gain at the second image sensing unit 12. The control unit 40 sets imaging conditions for the first image sensing unit 11 based on the imaging conditions (exposure factors like gain, storage time corresponding to shutter speed, etc.) when the proper exposure is obtained by the automatic exposure at the second image sensing unit 12 and the table.

When a difference between the degree of luminance in the central part of the image, which is based on the image data that the second image sensing unit 12 generates after imaging, and the degree of luminance in the peripheral part of the image is greater than a predetermined value, the control unit 40 may not set imaging conditions for the first image sensing unit 11 based on the imaging conditions when the proper exposure is obtained by the automatic exposure at the second image sensing unit 12.

When switching from causing the image, which is based on the image data that the first image sensing unit 11 generates after imaging, to appear on the second representation device 19 to causing the image, which is based on the image data that the second image sensing unit 12 generates after imaging, to appear on the second representation device 19, the control unit 40 causes the image, which is based on the image data that the second image sensing unit 12 generates after imaging, to appear on the second representation device 19 after setting imaging conditions (exposure factors like storage time corresponding to shutter speed, gain etc.) for the second image sensing unit 12 based on the imaging conditions (exposure factors like storage time corresponding to shutter speed, gain etc.) when a proper exposure is obtained by an automatic exposure at the first image sensing unit 11. Describing, as one example, the data storage part 35 stores a table that correlates varying degrees of luminance with different combinations of storage time and gain at the first image sensing unit 11 to varying degrees of luminance with different combinations of storage time and gain at the second image sensing unit 12. The control unit 40 sets imaging conditions for the second image sensing unit 12 based on the imaging conditions (exposure factors like gain, storage time corresponding to shutter speed, etc.) when the proper exposure is obtained by the automatic exposure at the first image sensing unit 11 and the table.

Figure 14:
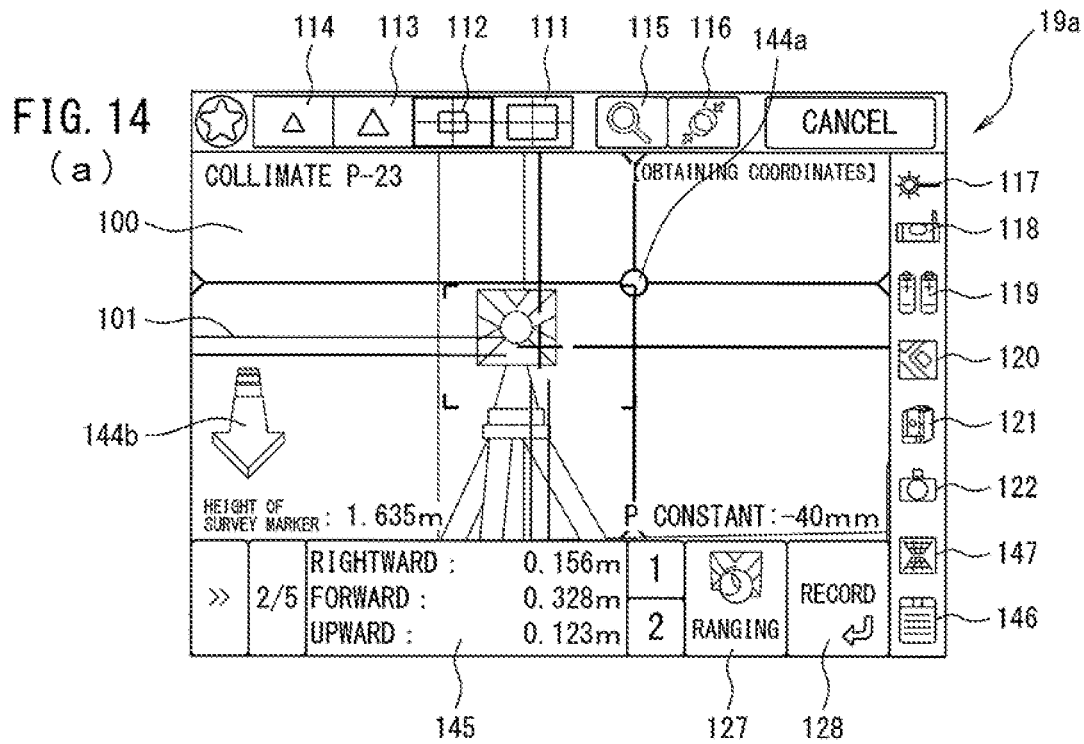
FIG. 14(*a*) illustrates one example of a coordinate measurement screen appearing on the second representation device 19 according to a coordinate measurement function.
Figure 14:
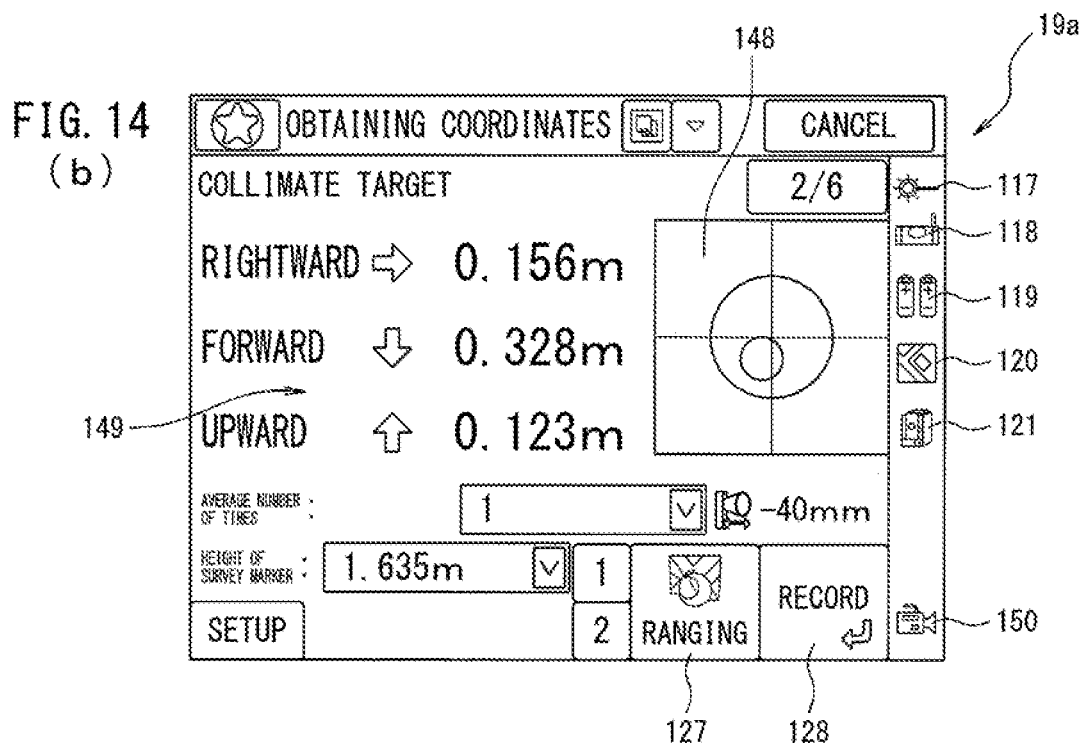

The setting of the imaging conditions when switching between the first image sensing unit 11 and the second image sensing unit 12 may be also applicable to the observation screen shown, for example, in FIG. 6, the photographic screen later described and illustrated in FIG. 12(*a*), the coordinate measurement screens later described and illustrated in FIGS. 14(*a*), 15(*a*) and 15(*b*), etc.

When, for example, an image having the first angle of view appears, as the object 100, on the second representation device 19, the target search object 115 is an object for showing the user the location which receives the user operation to cause automatic detection and collimation of a target in the image having the first angle of view using template matching, etc.

The photographic screen switching object 122 is an object for showing the user the location which receives the user operation to switch the image data that the first image sensing unit 11 generates after imaging or the image data that the second image sensing unit 12 generates after imaging to an imaged screen to be recorded in the data storage part 35. The control unit 40 causes the imaged screen to appear on the second representation device 19 upon determination that the user has tapped the display 19*a* the location where the photographic screen switching object 122 is shown.

The AR representation screen switching object 123 is an object for showing the user the location which receives the user operation to switch between a condition where observed object coordinate position information indicative of a coordinate position of an observed object determined based on design data, etc. appears as superimposed on the image, as the object 100, which is based on the image data that the first image sensing unit 11 or the second image sensing unit 12 generates after imaging, and a condition where the observed object coordinate position information does not appear.

The control unit 40 causes the observed object coordinate position information to appear on the second representation device 19 as superimposed on the image, as the object 100, which is based on the image data that the first image sensing unit 11 or the second image sensing unit 12 generates after imaging upon determination that the user has tapped the display 19*a* at the location where the AR representation screen switching object 123 is shown when the observed object coordinate position information does not appear on the image, which is based on the image data that the first image sensing unit 11 or the second image sensing unit 12 generates after imaging. The observed object coordinate position is shown using augmented reality (AR).

The control unit 40 causes the image, as the object 100, which is based on the image data that the first image sensing unit 11 or the second image sensing unit 12 generates after imaging to appear on the second representation device 19 with the observed object coordinate position information not appearing upon determination that the user has tapped the display 19*a* at the location where the AR representation screen switching object 123 is shown when the observed object coordinate position information appears as superimposed on the image, which is based on the image data that the first image sensing unit 11 or the second image sensing unit 12 generates after imaging.

The text representation screen switching object 124 is an object for showing the user the location which receives the user operation to switch to an observation screen with text representation. The control unit 40 causes the text representation screen to appear on the second representation device 19 upon determination that the user has tapped the display 19*a* at the location where the text representation screen switching object 124 is shown.

The function switching object 125 is an object for showing the user the location which receives the user operation to switch between objects for representation as the observation, input and setup object 126.

Describing, as one example, with an observation object 126*a* appearing as the observation, input and setup object 126, upon determination that the user has tapped the display 19*a* at the location where the function switching object 125 is shown, the control unit 40 causes an input object 126*b* to appear as the observation, input and setup object 126 on the second representation device 19.

Describing, as one example, with the input object 126*b* appearing as the observation, input and setup object 126, upon determination that the user has tapped the display 19*a* at the location where the function switching object 125 is shown, the control unit 40 causes a setup object 126*c* to appear as the observation, input and setup object 126 on the second representation device 19.

Describing, as one example, with the setup object 126*c* appearing as the observation, input and setup object 126, upon determination that the user has tapped the display 19*a* at the location where the function switching object 125 is shown, the control unit 40 causes an observation object 126*a* to appear as the observation, input and setup object 126 on the second representation device 19.

Either one object of the observation object 126*a*, the input object 126*b* and the setup object 126*c* appears as the observation, input and setup object 126. In FIG. 6, the observation object 126*a* appears as the observation, input and setup object 126 on the second representation device 19. The observation object 126*a* includes information as observation data. The observation data include at least one of horizontal angle data given by angle measurement with horizontal angle measuring part 31, vertical angle data given by angle measurement with vertical angle measuring part 32 and range data given by range finding with the range finder 13. In FIG. 6, the observation data include the information of horizontal angle data given by angle measurement with horizontal angle measuring part 31, the information of vertical angle data given by angle measurement with vertical angle measuring part 32 and the information of range data given by range finding with the range finder 13.

The range finding object 127 is an object for showing the user the location which receives the user operation to carry out range finding with the range finder 13 to determine a distance (i.e. a horizontal distance) to a surveyed object (for example, a target). The control unit 40 causes the range finder 13 to carry out range finding to determine a distance (i.e. a horizontal distance) to a surveyed object (for example, a target) upon determination that the user has tapped the display 19*a* at the location where the range finding object 127 is shown.

The record object 128 is an object for showing the user the location which receives user operation to record the observation data to the data storage part 35. The observation data include at least one of horizontal angle data given by angle measurement with horizontal angle measuring part 31, vertical angle data given by angle measurement with vertical angle measuring part 32 and range data given by distance measurement with the range finder 13. The control unit 40 causes the observation data to be recorded in the data storage part 35 upon determination that the user has tapped the display 19*a* at the location where the record object 128 is shown.

The object 101 is an electronically represented reticle. The object 101 is a line of collimation. The data storage part 35 stores reticle data indicative of plural kinds of reticle which are different in pattern (in design, in shape). A cross, a grid, a frame, a concentric circle, etc. can be considered as examples of the pattern. The reticle may be shown together with a scale (graduation). The control unit 40 causes reticle based on the reticle data stored in the data storage part 35 to appear, as the object 101, on the second representation device 19. The control unit 40 causes the reticle based on the reticle data stored in the data storage part 35 to appear, as the object 101, on the second representation device 19 as superimposed on the image, which is based on the image data that the first image sensing unit 11 or the second image sensing unit 12 generates after imaging. The reticle, as the object 101, may not appear on the second representation device 19.

The control unit 40 may change the reticle pattern in response to the image data that the first image sensing unit 11 or the second image sensing unit 12 generates after imaging for representation on the second representation device 19.

Describing, as one example, the control unit 40 changes the reticle pattern in response to the angle of view based on the image data that the first image sensing unit 11 or the second image sensing unit 12 generate after imaging for representation on the second representation device 19. Describing, as one example, the control unit 40 causes a reticle of a cross pattern or a reticle of a cross line to appear as the object 101 on the second representation device 19 when the image, which is based on the image data that the first image sensing unit 11 generates after imaging, appears as the object 100 on the second representation device 19, and the control unit 40 causes a reticle of a frame patter or a reticle of a frame line to appear as the object 101 on the second representation device 19 when the image, which is based on the image data that the second image sensing unit 12 generates after imaging, appears as the object 100 on the second representation device 19.

Describing, as one example, the control unit 40 makes a change to a reticle pattern in response to a pattern in the image, which is based on the image data that the first image sensing unit 11 or the second image sensing unit 12 generate after imaging, and causes the reticle pattern to appear on the second representation device 19. Describing, as one example, upon determination, based on the image data that the first image sensing unit 11 or the second image sensing unit 12 generates after imaging, that a predetermined pattern is contained in the image, the control unit 40 makes a change to provide a reticle pattern that is easy for the user to recognize and causes the reticle pattern to appear on the second representation device 19. Describing, as one example, upon determination, based on the image data that the first image sensing unit 11 or the second image sensing unit 12 generates after imaging, that a lattice pattern is contained in the image, the control unit 40 makes a change to a reticle such that lines of the reticle extend not along the lattice lines in the image by, for example, extending the lines of the reticle at 45 degrees in relation to the lattice lines and causes the reticle to appear on the second representation device 19. Describing, as one example, the control unit 40 makes a change to the line type of a reticle by, for example, drawing the reticle with dotted lines in response to a pattern in the image, which is based on the image data that the first image sensing unit 11 or the second image sensing unit 12 generate after imaging, and causes the reticle to appear on the second representation device 19.

Describing, as one example, the control unit 40 makes a change to color information of a reticle in response to color information contained in the image data that the first image sensing unit 11 or the second image sensing unit 12 generate after imaging, and causes the reticle to appear on the second representation device 19. Describing, as one example, the control unit 40 causes a reticle with color information, which is different from color information contained in the image data that the first image sensing unit 11 or the second image sensing unit 12 generate after imaging, to appear on the second representation device 19. Describing, as one example, the control unit 40 causes a white reticle to appear on the second representation device 19 when most of the image, which is based on the image data that the first image sensing unit 11 or the second image sensing unit 12 generate after imaging, is black. Describing, as one example, the control unit 40 predicts color information around a surveyed object (for example, a target) based on the image data that the first image sensing unit 11 or the second image sensing unit 12 generate after imaging, and causes a reticle with different color information from the predicted color information around the surveyed object (for example, the target) to appear on the second representation device 19.

Describing, as one example, the control unit 40 makes a change to color information of a reticle in response to luminance information contained in the image data that the first image sensing unit 11 or the second image sensing unit 12 generates after imaging, and causes the reticle to appear on the second representation device 19.

Describing, as one example, the control unit 40 causes a reticle to appear on the second representation device 19 and flash in response to the image data that the first image sensing unit 11 or the second image sensing unit 12 generates after imaging.

Figure 19:
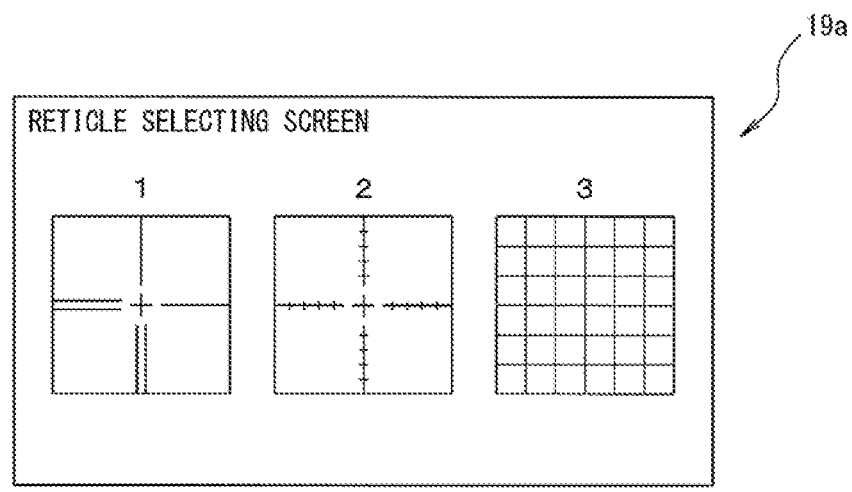
FIG. 19 illustrates one example of a reticle selecting screen.

The control unit 40 may make a change to provide a reticle pattern selected by user and cause the reticle to appear on the second representation device 19. Describing, as one example, the control unit 40 causes a reticle selecting screen to appear on the second representation device 19 for showing the location which receives user operation to allow a user's input to arbitrary select a reticle pattern. FIG. 19 shows one of examples of the reticle selecting screen. In the reticle selecting screen of FIG. 19, a cross with duplex 1, a cross with scales 2 and grids 3 are shown as reticle patterns which are selectable by the user. A desired reticle pattern is selected through touch interaction or number input or the like on the reticle selecting screen.

The object 102 is a guide for showing an angle of view that is established after making a change to an angle of view of the image, which appears as the object 100, toward the telephoto end in advance before the change. In the observation screen illustrated in FIG. 6, in which the image, which is the image based on the image data that the first image sensing unit 11 generates after imaging, having the second angle of view wider than the first angle of view appears as the object 100 on the second representation device 19, the object 102 shows the angle of view, which is established when the image having the first angle of view appears as the object 100 on the second representation device 19, in advance. When the image having the first angle of view appears as the object 100 on the second representation device 19, the object 120 does not appear on the second representation device 19 because there is no change to the angle of view toward the telephoto end beyond the first angle of view, see, for example, FIG. 9.

There is described in the above description an example in which, in relation to the image having the second angle of view appearing as the object 100, the first angle of view appears as the object 102 on the second representation device 19, but, in relation to, for example, the image having the fourth angle of view appearing as the object 100, the third angle of view may appear as the object 102 on the second representation device 19 or the first angle of view may appear as the object 102 on the second representation device 19.

With the observation image shown, for example, in FIG. 6, appearing on the second representation device 19, the control unit 40 causes the horizontal angle driver 15 and the vertical angle driver 17 to move the image sensing system 7 in response to the location on the display 19*a* tapped upon determination that the user has tapped the display 19*a* at the location where the image object 100 appears.

Figure 20:
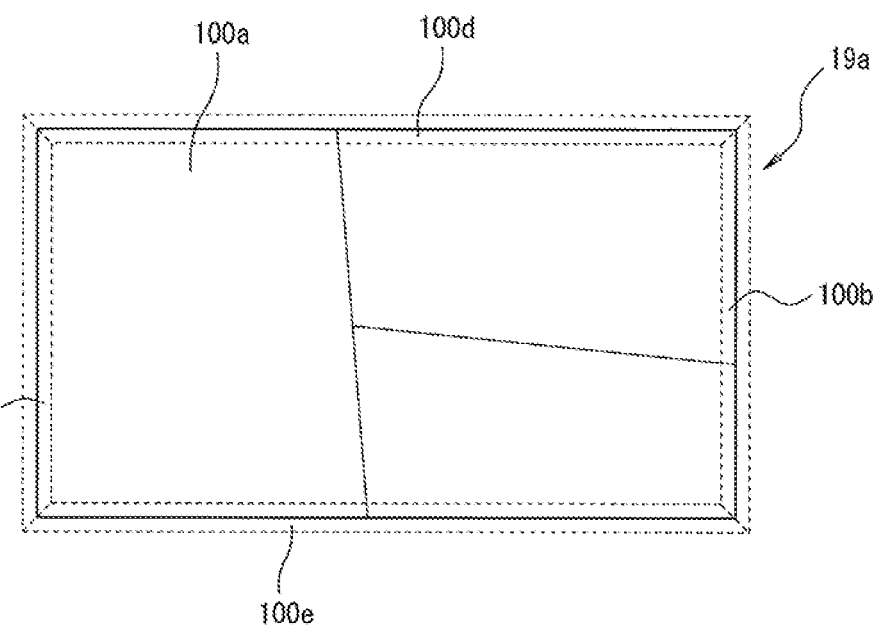
FIG. 20(a) illustrates one example of an observation screen appearing on the second representation device 19 according to the observation function.
FIG. 20(b) illustrates one example of an observation screen appearing on the second representation device 19 according to the observation function.
Figure 20:
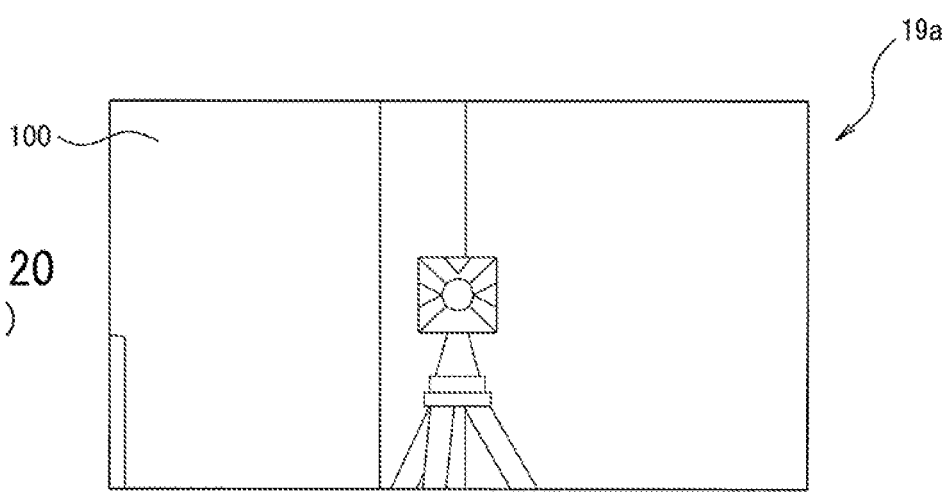

As illustrated in FIG. 20(*a*), the image, which is based on the image data that the first image sensing unit 11 or the second image sensing unit 12 generates after imaging, is divided into a first area 100*a* that includes the central portion, a second area 100*b* that includes the right end portion, a third area 100*c* that includes the left end portion, a fourth area 100*d* that includes the upper end portion, and a fifth area 100*e* that includes the lower end portion. For convenience of description, only the object 100 on the observation screen shown, for example, in FIG. 6 appears in FIG. 20(*a*).

Describing, as one example, with the observation image shown, for example, in FIG. 6, appearing on the second representation device 19, upon determination that the user has tapped the display 19*a* at the location where the first area 100*a* of the image object 100 appears, the control unit 40 causes the horizontal angle driver 15 and the vertical angle driver 17 to move until the image sensing system 7 is pointed in a direction toward the location on the display 19*a* tapped.

Describing, as one example, with the observation image shown, for example, in FIG. 6, appearing on the second representation device 19, upon determination that the user has tapped the display 19*a* at the location where the second area 100*b* of the image object 100 appears, the control unit 40 causes the horizontal angle driver 15 to rotate such that the line of collimation is tilted rightward by one horizontal angle of view as illustrated in FIG. 20(*b*).

Describing, as one example, with the observation image shown, for example, in FIG. 6, appearing on the second representation device 19, the control unit 40 causes the horizontal angle driver 15 to rotate such that the line of collimation is tilted leftward by one horizontal angle of view upon determination that the user has tapped the display 19*a* at the location where the third area 100*c* of the image object 100 appears.

Describing, as one example, with the observation image shown, for example, in FIG. 6, appearing on the second representation device 19, upon determination that the user has tapped the display 19*a* at the location where the fourth area 100*d* of the image object 100 appears, the control unit 40 causes the vertical angle driver 17 to rotate such that the line of collimation is tilted upward by one horizontal angle of view.

Describing, as one example, with the observation image shown, for example, in FIG. 6, appearing on the second representation device 19, upon determination that the user has tapped the display 19*a* at the location where the fifth area 100*e* of the image object 100 appears, the control unit 40 causes the vertical angle driver 17 to rotate such that the line of collimation is tilted downward by one horizontal angle of view.

When the horizontal angle driver 15 is caused to rotate the line of collimation by one (1) horizontal angle of view, the control unit 40 includes a period when the horizontal angle driver 15 rotates in response to a first duty ratio and a period when the horizontal angle driver 15 rotates in response to a second duty ratio that is lower than the first duty ratio.

When the horizontal angle driver 15 is caused to rotate the line of collimation by one (1) horizontal angle of view, the control unit 40 includes a period when the horizontal angle driver 15 rotates at a first speed and a period when the horizontal angle driver 15 rotates at a second speed that is lower than the first speed.

Describing, as one example, the control unit 40 causes the horizontal angle driver 15 to rotate the line of collimation at the first speed till ¼ horizontal angle of view, at the second speed from ¼ horizontal angle of view to ¾ horizontal angle of view, and at the first speed from ¾ horizontal angle of view to 1 horizontal angle of view.

Describing, as one example, the control unit 40 causes the horizontal angle driver 15 to rotate the line of collimation at the first speed till ¾ horizontal angle of view, and at the second speed from ¾ horizontal angle of view to 1 horizontal angle of view.

Describing, as one example, the control unit 40 causes the horizontal angle driver 15 to rotate the line of collimation at the second speed till ¾ horizontal angle of view, and at the first speed from ¾ horizontal angle of view to 1 horizontal angle of view.

The control unit 40 may apply the control strategy when the horizontal angle driver 15 rotates the line of collimation by 1 horizontal angle of view to the control when the vertical angle driver 17 rotates the line of collimation by 1 vertical angle of view.

Figure 7:
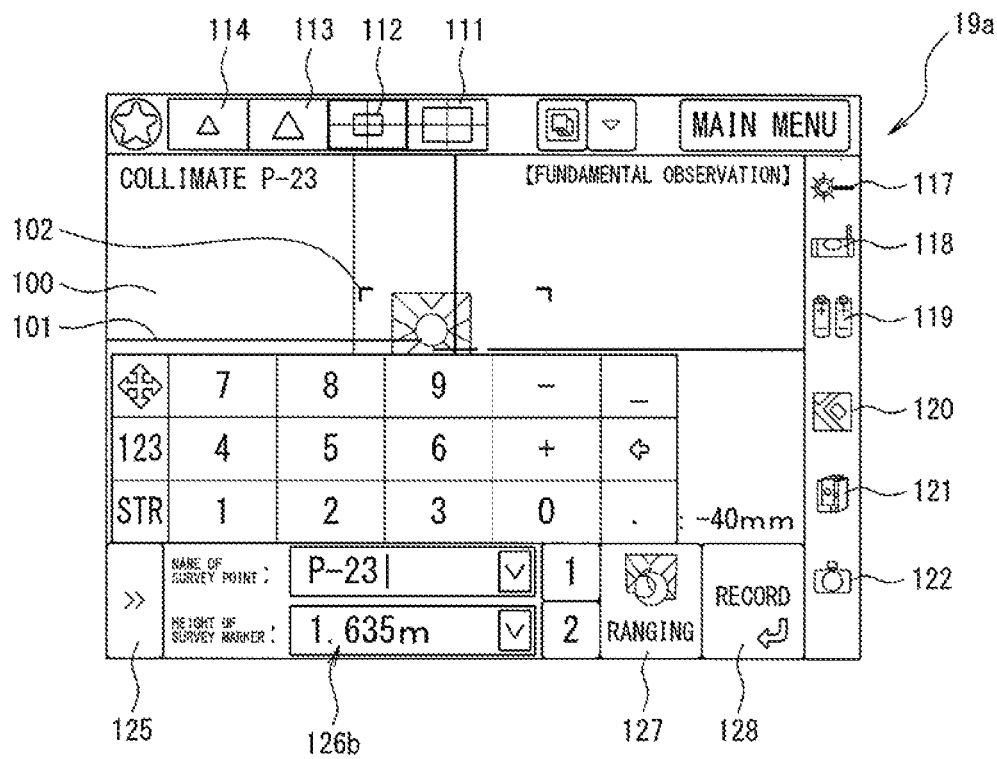
FIG. 7 illustrates one example of an observation screen appearing on the second representation device 19 according to the observation function.

FIG. 7 illustrates one example of observation screen that is caused to appear on the second representation device 19 according to the observation function. Describing, as one example, when, with the observation screen illustrated in FIG. 6 appearing on the second representation device 19, the control unit 40 determines that the user has tapped the display 19a at the location where the function switching object 125 is shown, the control unit 40 causes the observation screen illustrated in FIG. 7 to appear on the second representation device 19.

In the observation screen illustrated in FIG. 7, the input object 126b appears as the observation, input and setup object 126. The input object 126b includes an object for the user to enter the name of a survey point, an object for the user to enter the height of a survey marker, i.e. the height from the ground to a survey marker or target, and an object that receives user operation to enter letters and figures.

Figure 8:
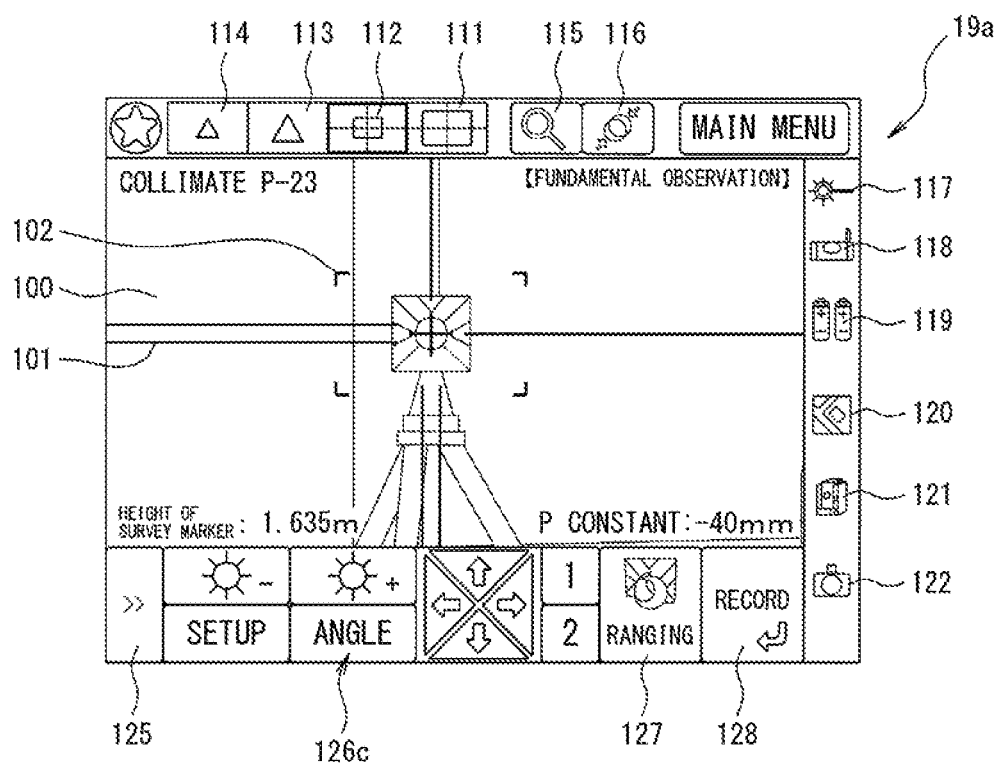
FIG. 8 illustrates one example of an observation screen appearing on the second representation device 19 according to the observation function.

FIG. 8 illustrates one example of observation screen that is caused to appear on the second representation device 19 according to the observation function. Describing, as one example, when, with the observation screen illustrated in FIG. 7 appearing on the second representation device 19, the control unit 40 determines that the user has tapped the display 19a at the location where the function switching object 125 is shown, the control unit 40 causes the observation screen illustrated in FIG. 8 to appear on the second representation device 19.

In the observation screen illustrated in FIG. 8, the setup object 126c appears as the observation, input and setup object 126. The setup object 126c includes an object for showing the user the location which receives the user operation to carry out exposure compensation, i.e. a feature to allow the user to adjust the automatically calculated exposure value for the first image sensing unit 11 or the second image sensing unit 12 to make the image brighter or darker, an object for showing the user the location which receives the user operation to carry out settings of the first image sensing unit 11, settings of the second image sensing unit 12 and settings of the range finder 13, an object for showing the user the location which receives the user operation to carry out angle settings including zero sets, and objects, (i.e. an up-arrow object, a down-arrow object, a left-arrow object and a right-arrow object) for showing the user the location which receives the user operation to alter directions of the image sensing system 7, i.e. a horizontal direction and a vertical direction.

Describing, as one example, with the observation image shown, for example, in FIG. 8, appearing on the second representation device 19, upon determination that the user has tapped the display 19a at the location where the up-arrow object appears, the control unit 40 causes the vertical angle driver 17 to rotate such that the line of collimation is tilted upward by one vertical angle of view. Describing, as one example, with the observation image shown, for example, in FIG. 8, appearing on the second representation device 19, upon determination that the user has tapped the display 19a at the location where the down-arrow object appears, the control unit 40 causes the vertical angle driver 17 to rotate such that the line of collimation is tilted downward by one vertical angle of view. Describing, as one example, with the observation image shown, for example, in FIG. 8, appearing on the second representation device 19, upon determination that the user has tapped the display 19a at the location where the left-arrow object appears, the control unit 40 causes the horizontal angle driver 15 to rotate such that the line of collimation is tilted leftward by one horizontal angle of view. Describing, as one example, with the observation image shown, for example, in FIG. 8, appearing on the second representation device 19, upon determination that the user has tapped the display 19a at the location where the right-arrow object appears, the control unit 40 causes the horizontal angle driver 15 to rotate such that the line of collimation is tilted rightward by one horizontal angle of view.

Describing, as one example, with the observation image illustrated in FIG. 8, appearing on the second representation device 19, upon determination that the user has tapped the display 19a at the location where the function switching object 125 appears, the control unit 40 causes the observation image illustrated in FIG. 6 to appear on the second representation device 19.

Figure 9:
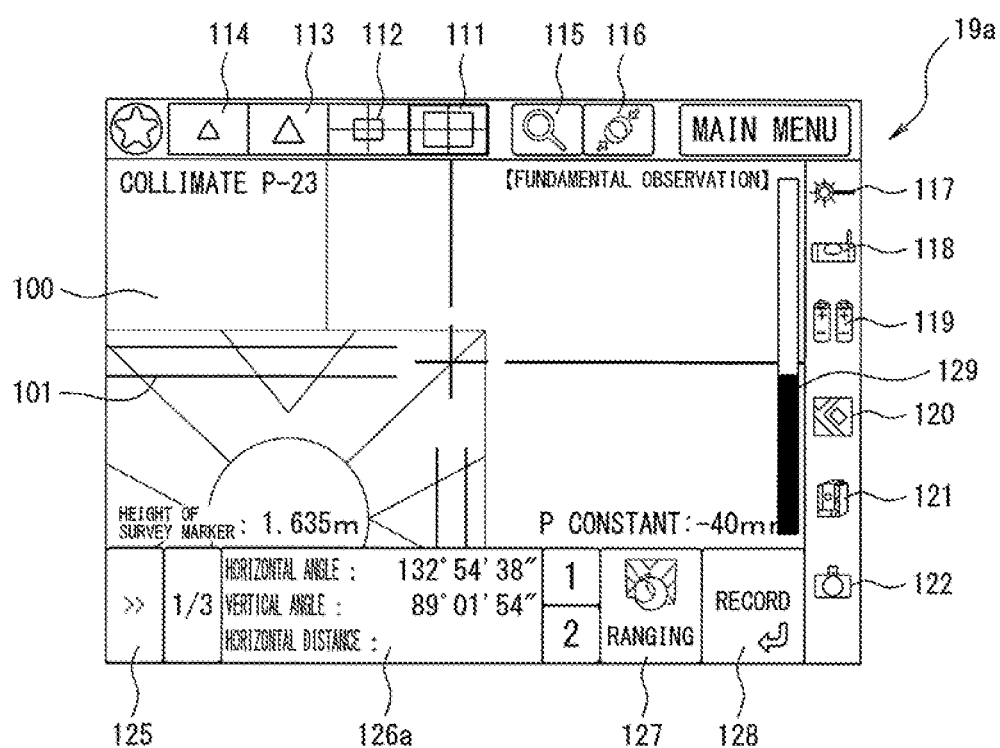
FIG. 9 illustrates one example of an observation screen appearing on the second representation device 19 according to the observation function.

FIG. 9 illustrates one example of observation screen that is caused to appear on the second representation device 19 according to the observation function. Describing, as one example, when, with the observation screen illustrated in FIG. 5 appearing on the second representation device 19, the control unit 40 determines that the user has tapped the display 19a at the location where the first angle of view selecting object 111 is shown and that the user has operated a focus adjustment operation part (in the form of, for example, a knob), i.e. a tool operated by the user to adjust the focus of the first image sensing unit 11, the control unit 40 causes the observation screen illustrated in FIG. 9 to appear on the second representation device 19.

The observation screen illustrated in FIG. 9 includes a distance indicator object 129. The distance indicator object 129 indicates the focus position in a range from the minimum focus distance of the first image sensing unit 11 to the infinity. Describing, as one example, the distance indicator object 129 appears during a period when the user operates the focus adjustment operation part. Describing, as one example, the distance indicator object 129 keeps on appearing for a predetermined time (for example, 3 seconds) after the period when the user operates the focus adjustment operation part, but disappears when the predetermined time has elapsed.

The reticle, as the object 101, in the observation screen illustrated in FIG. 9 is shown after magnifying the retile, as the object 101, in the observation screen in FIG. 6. The angle of view of the image, as the object 100, in the observation screen illustrated in FIG. 9 is narrower than the angle of view of the image, as the object 100, in the observation screen illustrated in FIG. 6. The reticle, as the object 101, in the observation screen is shown on the second representation device 19 on the scale that is determined in response to the angle of view of the image, as the object 100.

Figure 10:
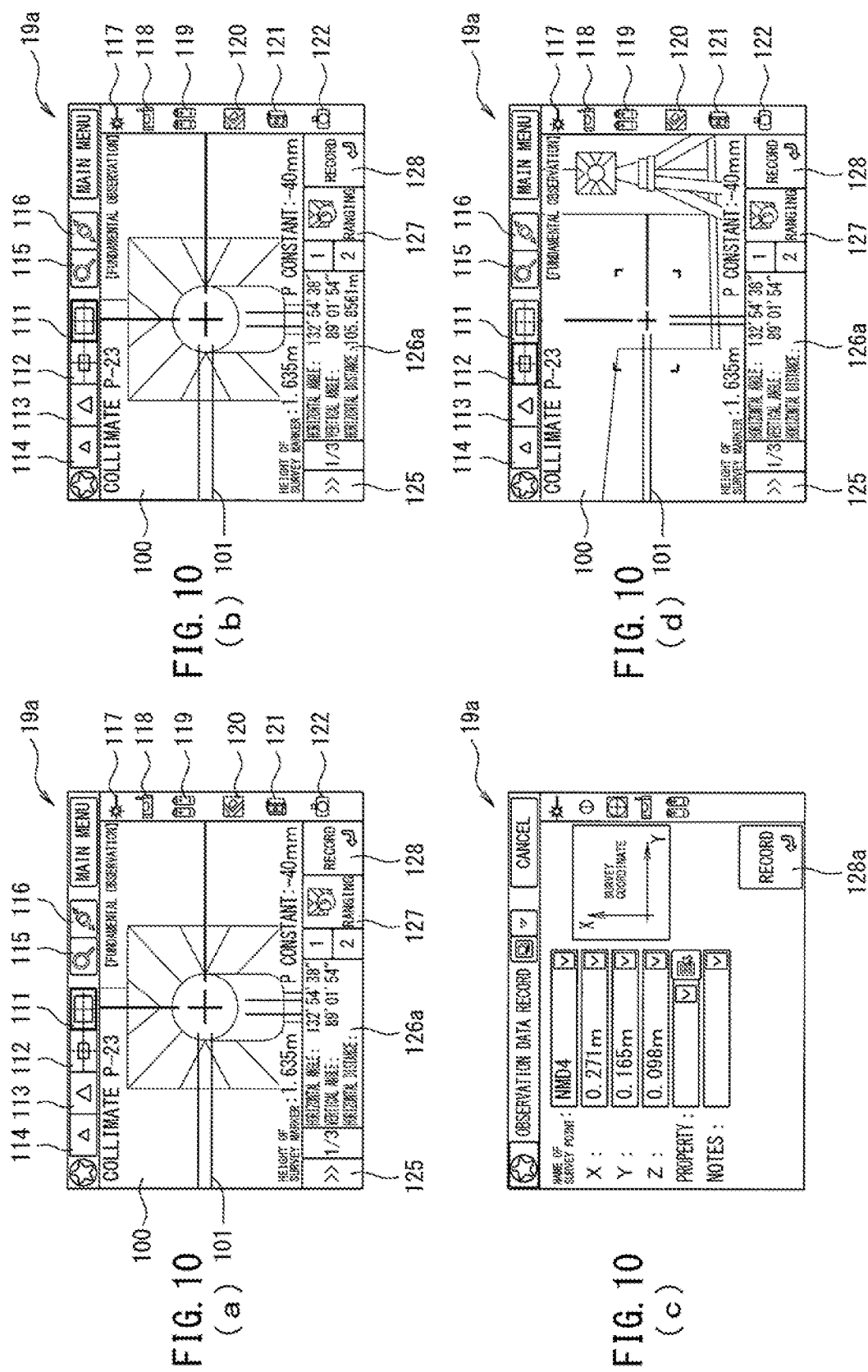
FIG. 10(*a*) illustrates one example of an observation screen appearing on the second representation device 19 according to the observation function.

FIG. 10 illustrates one example of observation screen that is caused to appear on the second representation device 19 according to the observation function. FIG. 10(a) is a view of the observation screen in a state before measuring a distance to a survey object (for example, a target) by the range finder 13. In FIG. 10(a), the first angle of view selecting object 111 has received the operation by the user. In FIG. 10(a), the image having the first angle of view, which is based on the image data that the first image sensing unit 11 generates after imaging, is shown, as the object 100, on the second representation device 19.

When, with the first angle of view selecting object 111 having received the user operation, i.e. the image having the first angle of view, which is based on the image data that the first image sensing unit 11 generates after imaging, is shown on the second representation device 19, the user taps the display 19a at the location where the record object 128 appears, the control unit 40 allows recording of the observation data in the data storage part 35.

The observation screen illustrated in FIG. 10(a) includes information on horizontal angle data given by angle measurement with the horizontal angle measuring part 31 and information on vertical angle data given by angle measurement with the vertical angle measuring part 32, but the observation screen illustrated in FIG. 10(a) does not include information on ranging data given by distance measurement with the range finder 13 because the distance measurement with the range finder 13 with respect to the survey object (for example, the target) is not carried out.

FIG. 10(b) illustrates the observation screen after carrying out the distance measurement with the range finder 13 with respect to the survey object (for example, the target). Describing, as one example, when the control unit 40 determines that the user has tapped the display 19a at the location where the range finding object 127 appears, the observation screen illustrated in FIG. 10(b) appears on the second representation device 19.

For example, when, with the observation screen illustrated in FIG. 10(a) appearing on the second representation device 19, the user taps the display 19a at the location where the range finding object 127 appears, the control unit 40 determines that the user has tapped the display 19a at the location where the range finding object 127 appears and causes the range finder 13 to measure a distance (i.e. a horizontal distance) to the survey object (for example, the target). When the range finder 13 measures the distance (i.e. the horizontal distance) to the survey object (for example, the target), information, which is based on ranging data obtained by the distance measurement with the range finder 13, appears, as the observation object 126a, on the second representation device 19 as illustrated in FIG. 10(b). The observation screen illustrated in FIG. 10(b) includes information on horizontal angle data given by angle measurement with the horizontal angle measuring part 31, information on vertical angle data given by angle measurement with the vertical angle measuring part 32, and information on ranging data given by distance measurement with the range finder 13.

If, as illustrated in FIG. 10(a), the reticle with no graduations appears, as the object 101, on the second representation device 19a before carrying out the distance measurement with the range finder 13 with respect to the survey object (for example, the target), it is allowed to change the reticle with no graduations to a reticle with graduations and to cause the reticle with graduations to appear on the second representation device 19 after carrying out the distance measurement with the range finder 13 with respect to the survey object (for example, the target). The reticle with graduations is caused to appear after making the graduation width (graduation interval, scale width) variable with the observation data including the ranging data.

FIG. 10(c) illustrates one example of observation data recording screen. Describing, as one example, when, with the observation screen illustrated in FIG. 10(b) appearing on the second representation device 19, the control unit 40 determines that the user has tapped the display 19a at the location where the record object 128 appears, the observation data recording screen illustrated in FIG. 10(c) appears on the second representation device 19. The observation data recording screen illustrated in FIG. 10(c) includes an object for the user to enter the name of survey point, survey coordinate position information, an object for the use to enter the property, an object for the user to enter notes, and an object 128a for showing the user the location that receives the user operation to cause the control unit 40 to perform processing to record the observation data to the data storage part 35. The control unit 40 causes the data storage part 35 to record the observation data upon determination that the user has tapped the display 19a at the location where the object 128a appears.

When the observation data are recorded in the data storage part 35, the control unit 40 may record the image data, which the first image sensing unit 11 generates after imaging, into the date storage part 35 together with the observation data.

Describing, as one example, the control unit 40 records the observation data and the image data into the data storage part 35 as individual files. Then, the control unit 40 records the observation data and the image data into the data storage part 35 with the file name of the observation data associated with the file name of the image data. Including the same string into the final name of the observation data and the file name of the image data may be considered as one example of associating the file name of the observation data with the file name of the image data.

Describing, as one example, the control unit 40 records the observation data and the image data into the data storage part 35 as a single (or the same) file. Describing, as one example, the control unit 40 records the observation data and the image data into the data storage part as a JPEG file including the observation data and the image data. Describing, as one example, the observation data is recorded in a maker note of Exif (Exchangeable Image File Format).

Upon recording the image data together with the observation data into the data storage part 35, the control unit 40 may record the reticle data, which correspond to the reticle appearing, as the object 101, on the second representation device 19, into the data storage part 35. Describing, as one example, upon causing the image, which is based on the image data recorded in the data storage part 35, to reappear on the second representation device 19, the control unit 40 causes the reticle, which is based on the reticle data corresponding to the image data to reappear, to appear on the second representation device 19 as superimposed on the image. Describing, as one example, if the recorded reticle data are associated with the image data recorded in the data storage part 35, the control part 35 allows, for example, the user operation to switch between one representation mode, in which the reticle based on the reticle data appears on the second representation device 19 as super imposed on the image based on the image data, and another representation mode, in which only the image based on the image data appears on the second representation device 19 without causing the reticle based on the reticle data to appear on the second representation device 19.

FIG. 10(d) illustrates one example of the observation screen appearing on the second representation device 19 after completion of processing of recording the observation data to the data storage part 35. In the observation screen of FIG. 10(d), the image, which is the same as the image based on the image data that the first image sensing unit 11 generates after imaging, having the second angle of view wider than the first angle of view appears as the object 100. When the processing of recording the observation data to the data storage part 35 is completed, the control unit 40 changes the image, which is based on the image data that the first image sensing unit 11 generates after imaging, having the first angle of view to the image, which is the same as the image based on the image data that the first image sensing unit 11 generates after imaging, having the second angle of view and causes the image having the second angle of view to appear as the object 100. Then, the control unit 40 performs control for preventing the observation data from being recorded to the data storage part 35 because the image having the first angle of view, which is based on the image data that the first image sensing unit 11 generates after imaging, does not appear. Describing, as one example, with the observation screen illustrated in FIG. 10(d) appearing, even if the display 19a is tapped at the location where the record object 128 appears, the control unit 40 does not allow the observation data recording screen illustrated in FIG. 10(c) to appear. Describing, as one example, in the observation screen illustrated in FIG. 10(d), the record object 128 is changed, in representation form, and grayed out, to show the user that the observation data cannot be recorded to the data storage part 35. Graying out the record object 128 is only an example to show the user that the observation data cannot be recorded to the data storage part 35. Another example is to hide the record object 128 to show the user that the observation data cannot be recorded to the data storage part 35.

FIG. 11(a) illustrates one example of leveling screen appearing on the second representation device 19 according to a leveling function. Describing, as one example, when, with the observation screen illustrated in FIG. 6 appearing on the second representation device 19, the control unit 40 determines that the user has tapped the display 19a at the location where a bubble tube showing object 118, the control unit 40 causes the leveling screen illustrated in FIG. 11(a) to appear on the second representation device 19.

FIG. 11(a) illustrates the leveling screen appearing on the second representation device, which leveling screen includes an image object 200, a first bubble tube object 201, a second bubble tube object 202, a reticle object 203, a tripod vertical position object 204, a level screw object 205 and a confirmation object 206.

The image object 200 is an image based on image data that the third image sensing unit 14 generates after imaging.

The first bubble tube object 201 is an object that indicates a tilt of the vertical axis of the surveying instrument 1 by graphic representation. Describing, as one example, the first bubble tube object 201 indicates a tilt of the surveying instrument 1 given by calculation based on an output of a tilt sensor (a tilt detector, for example, a first tilt sensor (a first tilt detector)) included in the surveying instrument 1. Describing, as one example, the first bubble tube object 201 imitates the shape of a circular bubble tube. Describing, as one example, the first bubble tube object 201 imitates the shape of a round bubble tube.

The second bubble tube object 202 includes: an object 202a which indicates a tilt of the surveying instrument 1 in relation to a first direction that is a direction kept level to the level plane of the surveying instrument 1, i.e. levelness in the first direction, by graphic representation; an object 202b which indicates a tilt of the surveying instrument 1 in relation to the first direction that is kept level to the level plane of the surveying instrument 1, i.e. levelness in the first direction, in numbers; an object 202c which indicates a tilt of the surveying instrument 1 in relation to a second direction that is a direction kept level to the level plane of the surveying instrument 1 and that is orthogonal to the first direction, i.e. levelness in the second direction, by graphic representation; and an object 202d which indicates a tilt of the surveying instrument 1 in relation to the second direction that is kept level to the level plane of the surveying instrument 1 and that is orthogonal to the first direction, i.e. levelness in the second direction, in numbers. Describing, as one example, the object 202a imitates the shape of a cylindrical bubble tube. Describing, as one example, the object 202a imitates the shape of a bar bubble tube. Describing, as one example, the object 202a imitates the shape of a flat bubble tube. Describing, as one example, the object 202c imitates the shape of a cylindrical bubble tube. Describing, as one example, the object 202c imitates the shape of a bar bubble tube. Describing, as one example, the object 202c imitates the shape of a flat bubble tube. Describing, as one example, the second bubble tube object 202 indicates a tilt of the surveying instrument 1 given by calculation based on an output of a tilt sensor (a tilt detector, for example, a second tilt sensor (a second tilt detector)) included in the surveying instrument 1. Describing, as one example, the sensitivity of the second tilt sensor (second tilt detector) is higher than that of the first tilt sensor (first tilt detector). Describing, as one example, the sensitivity that is shown by the second bubble tube object 202 is higher than the sensitivity that is shown by the first bubble tube object 201.

The reticle object 203 is an electronically represented reticle. Reticle data corresponding to the electronic reticle are recorded in the data storage part 35. In the leveling screen illustrated in FIG. 11(a), a pattern for the electronic reticle is a double circle. The pattern for the electronic reticle in the leveling screen is not limited to the double circle and may be, for example, a circle, a triple circle or more. The control unit 40 causes the electronic reticle as the reticle object 203 to appear on the second representation device 19 as superimposed to an image, as the image object 200, which is based on image data that the third image sensing unit 13 generates after imaging.

The tripod vertical position object 204 is an object that indicates a tripod vertical position. The control unit 40 calculates the tripod vertical position using a tilt of the surveying instrument 1 that is calculated based on an output of the tilt sensor included in the surveying instrument 1. In response to the calculated tripod vertical position, the control unit 40 causes the tripod vertical position object 204 to appear on the second representation device 19 as superimposed to the image based on the image data that the third image sensing unit 14 generates after imaging.

The level screw object 205 indicates the level screws 5 provided in the leveling system 2 by graphic representation, and indicates directions in which the level screws 5 should be turned by the user to level the surveying instrument 1. The level screw object 205 includes an object 205a, an object 205*b* and an object 205*c*. The object 205*a*, object 205*b* and object 205*c* imitate three level screws 5.

The object 205*a* is a semicircle which imitates one of the level screws 5 and which appears in contact with the upper side of the image. The control unit 40 determines that there is no need for the user to turn the corresponding level screw 5 to the object 205*a* for leveling the surveying instrument 1 based on an output of the tilt sensor included in the surveying instrument 1 to cause the direction in which the user should turn the level screw 5 to disappear.

The object 205*b* is a quadrant which imitates another of the level screws 5 and which appears in contact with the left side and the lower side of the image. The control unit 40 determines that there is need for the user to turn the corresponding level screw 5 to the object 205*b* for leveling the surveying instrument 1 based on an output of the tilt sensor included in the surveying instrument 1 to cause an arrow indicative of the direction in which the user should turn the level screw 5 to appear.

The object 205*c* is a quadrant which imitates the other of the level screws 5 and which appears in contact with the right side and the lower side of the image. The control unit 40 determines that there is need for the user to turn the corresponding level screw 5 to the object 205*c* for leveling the surveying instrument 1 based on an output of the tilt sensor included in the surveying instrument 1 to cause an arrow indicative of the direction in which the user should turn the level screw 5 to appear.

The confirmation object 206 is an object for showing the user the location to receive the user operation to terminate the leveling function. The control unit 40 causes the observation screen illustrated in FIG. 6, for example, to appear on the second representation device 19 upon determining that the user has tapped the display 19*a* at the location where the confirmation object 206 appears.

Figure 11:
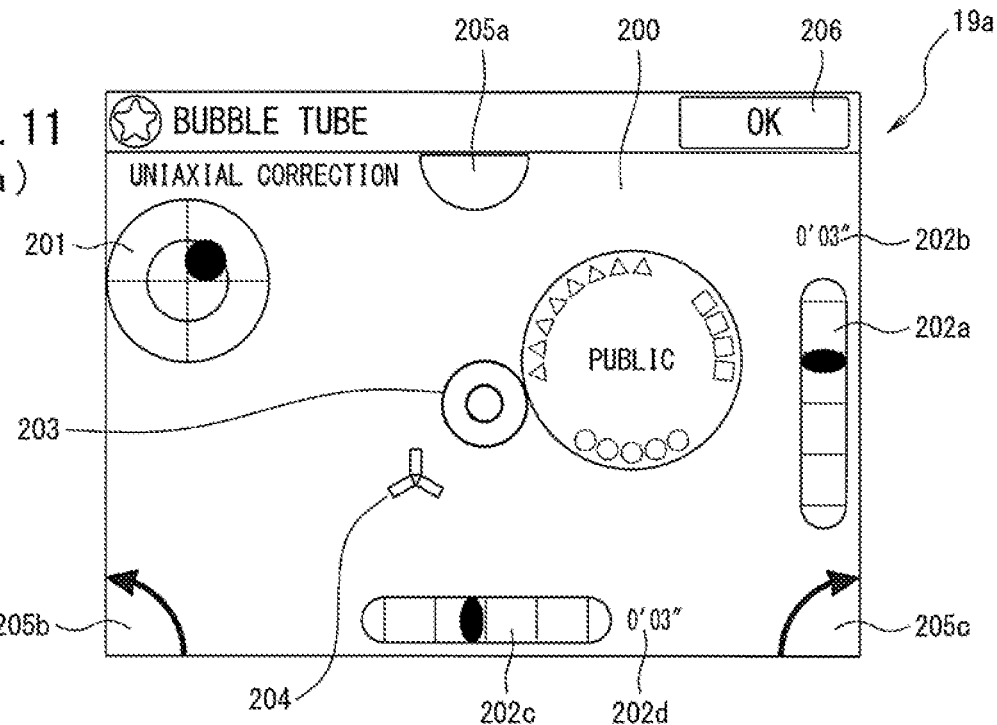
FIG. 11(*a*) illustrates one example of a leveling screen appearing on the second representation device 19 according to a leveling function.
Figure 11:
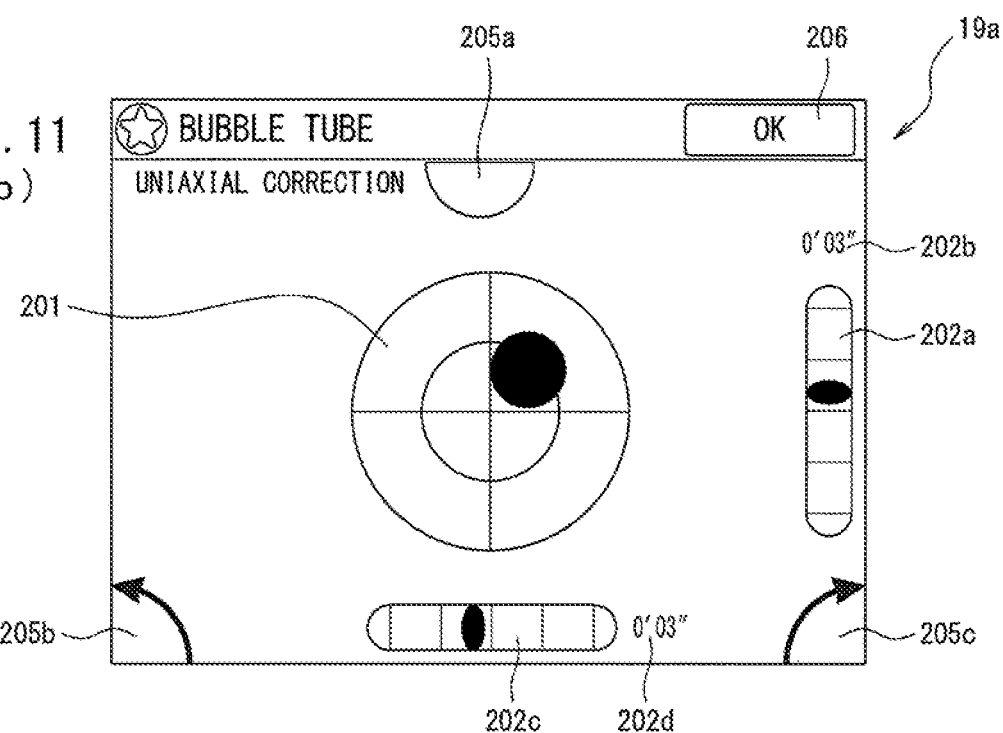

FIG. 11(*b*) illustrates one example of the leveling screen that appears on the second representation device 19 according to the leveling function. Describing, as one example, when, with the observation screen illustrated in FIG. 6 appearing on the second representation device 19, the control unit 40 determines that the user has tapped the display 19*a* at the location where the bulb tube showing object 118 is shown, the control unit 40 causes the leveling screen illustrated in FIG. 11(*b*) to appear on the second representation device 19.

With the observation screen illustrated in FIG. 6 appearing on the second representation device 19, upon determination that the user tapped the display 19*a* at the location where the bulb tube showing object 118 is shown, the control unit 40 causes one of, for example, the leveling screen illustrated in FIG. 11(*a*) and the leveling screen illustrated in FIG. 11(*b*) selected by the user beforehand to appear on the second representation device 19.

The leveling screen illustrated in FIG. 11(*b*) differs from the leveling screen illustrated in FIG. 11(*a*) in that the image object 200 is not included.

Figure 12:
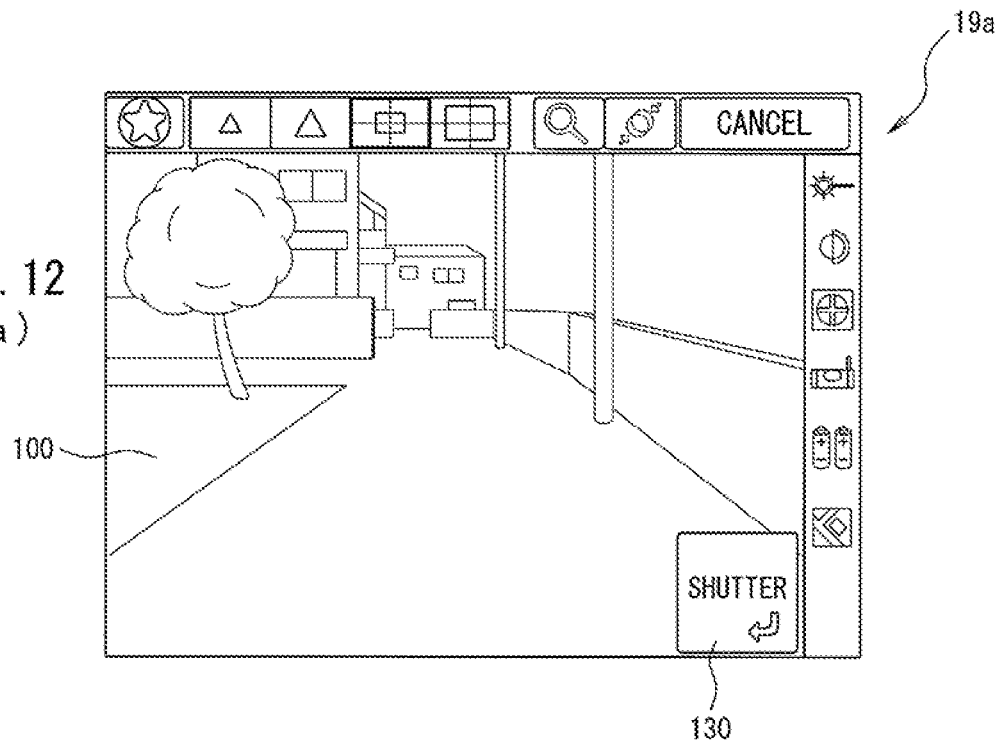
FIG. 12(*a*) illustrates one example of a photographic screen appearing on the second representation device 19.
Figure 12:
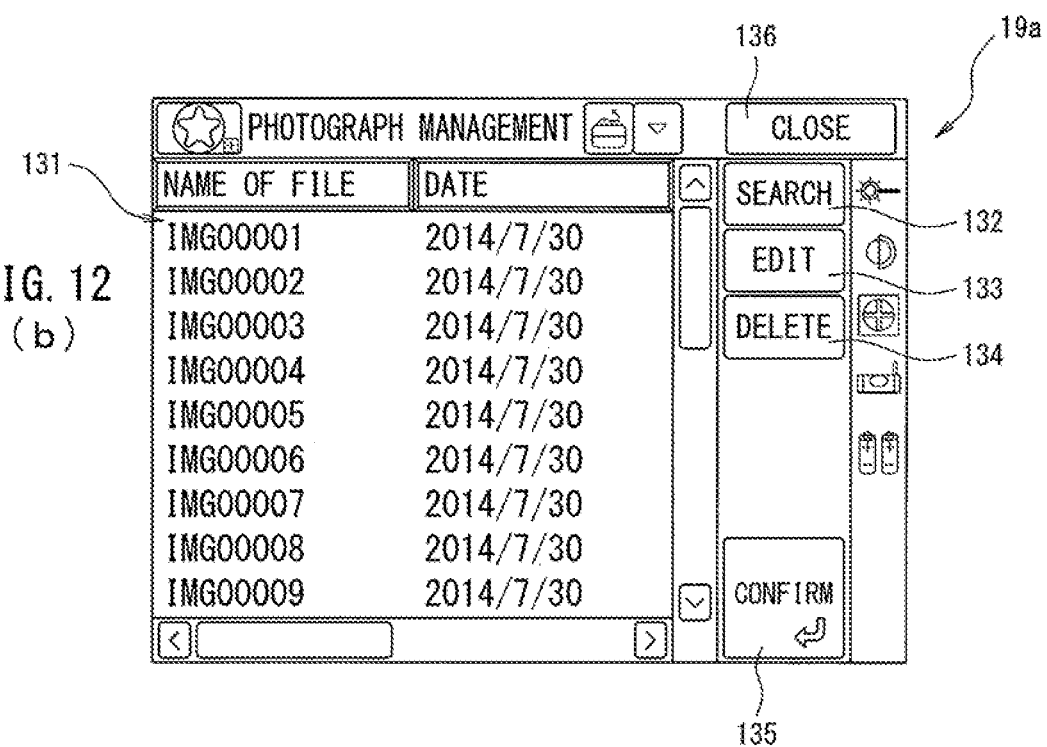

FIG. 12(*a*) illustrates one example of the photographic screen appearing on the second representation device 19. Describing, as one example, when, with the observation screen illustrated in FIG. 6 appearing on the second representation device 19, the control unit 40 determines that the user has tapped the display 19*a* at the location where the photographic screen switching object 122 is shown, the control unit 40 causes the photographic screen illustrated in FIG. 12(*a*) to appear on the second representation device 19.

The photographic screen illustrated in FIG. 12(*a*) includes a photographing instructing object 130. The photographing instructing object 130 is an object for showing the user the location to receive the user operation to record the image data, which the first image sensing unit 11 generates after imaging, or the image data, which the second image sensing unit 12 generates after imaging, to the data storage part 35. Upon determination that the user has tapped the display 19*a* at the location where the photographing instructing object is shown, the control unit 40 conducts recording the image data, which the first image sensing unit 11 generates after imaging, or the image data, which the second image sensing unit 12 generates after imaging, to the data storage part 35, and causes the photograph management screen illustrated in FIG. 12(*b*) to appear on the second representation device.

The photographic screen illustrated in FIG. 12(*a*) does not include the reticle object 101 indicative of reticle and the object 102 indicative of an angle of view after change in angle of view.

FIG. 12(*b*) illustrates one example of photograph management screen appearing on the second representation device 19. Describing, as one example, when, with the photographic screen illustrated in FIG. 12(*a*) appearing on the second representation device 19, the control unit 40 determines that the user taps the display 19*a* at the location the photographing instruction object 130 is shown, the control unit 40 causes the photograph management screen illustrated in FIG. 12(*b*) to appear on the second representation device 19.

The photograph management screen illustrated in FIG. 12(*b*) includes a recorded image data list object 131, a search object 132, an edit screen switching object 133, a deletion object 134, a confirmation object 135 and an end object 136.

The recorded image data list object 131 represents a list of image data recorded in the data storage part 35. Describing, as one example, the image data are represented in a list form that includes name of file and date.

The search object 132 is an object for showing the user the location to receive the user operation to perform search for the image data recorded in the data storage part 35. Describing, as one example, upon determining that the user has tapped the display 19*a* at the location where the search object 132 appears, the control part 40 causes a window that requests the user to enter a search condition to appear and performs search upon completion of entering the search condition.

Figure 13:
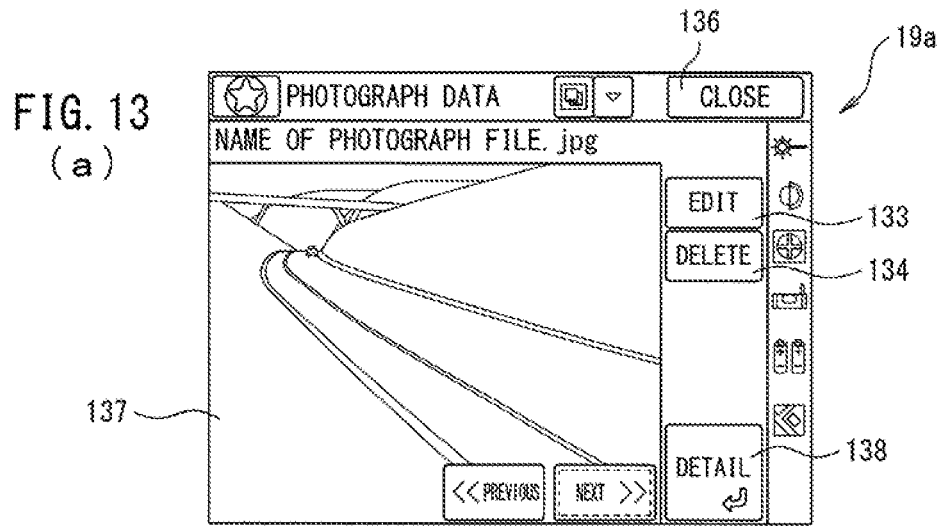
FIG. 13(*a*) illustrates one example of a photograph data screen appearing on the second representation device 19.
Figure 13:
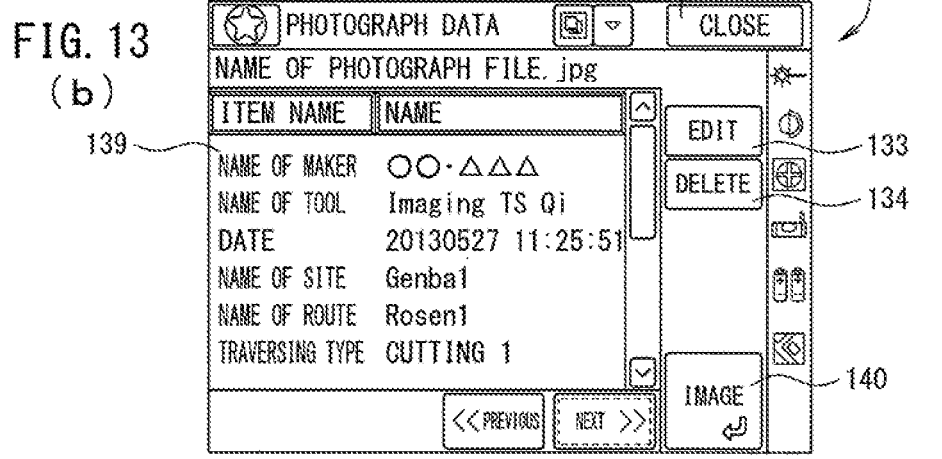
Figure 13:
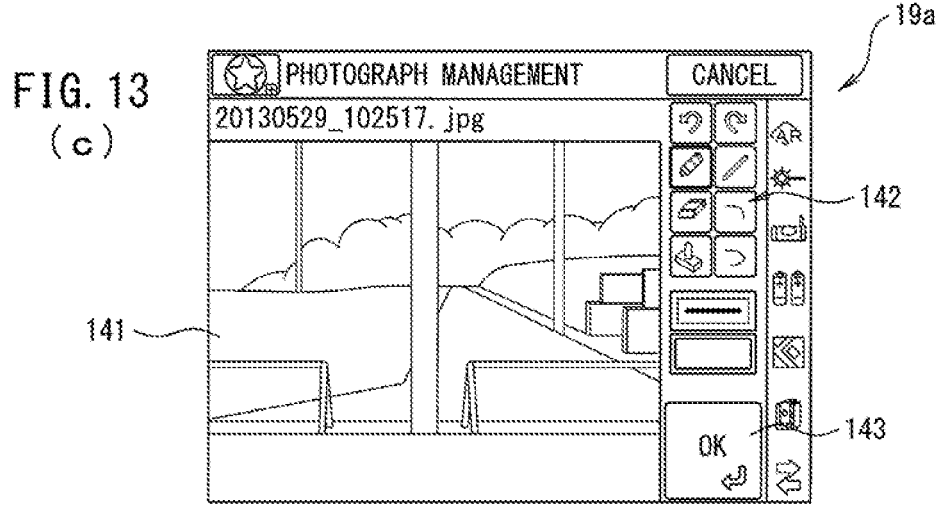

The edit screen switching object 133 is an object for showing the user the location to receive the user operation to perform an editing for one image data selected by the user among image data included in the recorded image data list object 131. Upon determining that the user tapped the display 19*a* at the location where the edit screen switching object 133 is shown, the control unit 40 causes a photograph management screen illustrated in FIG. 13(*c*), for example, to appear on the second representation device 19.

The deletion object 134 is an object for showing the user the location to receive the user operation to perform a deleting processing for the image data selected by the user among the image data included in the recorded image data list object 131. Describing, as one example, upon determining that the user tapped the display 19*a* at the location where the deletion object 134 is shown, the control unit 40 performs the deleting processing for the image data selected by the user among the image data included in the recorded image data list object 131.

The confirmation object 135 is an object for showing the user the location to receive the user operation to perform a confirmation processing for the image data selected by the user among the image data included in the recorded image data list object 131. Describing, as one example, upon determining that the user has tapped the display 19a at the location where the confirmation object 135 is shown, the control part 40 causes the photographic data illustrated in FIG. 13(c) to appear on the second representation device 19.

The end object 136 is an object for showing the user the location to receive the user operation to end the photograph management screen illustrated in FIG. 12(b). Upon determining that the user has tapped the display 19a at the location where the end object 136 is shown, the control part 40 causes the photographic screen illustrated, for example, in FIG. 12(a) to appear on the second representation device 19.

FIG. 13(a) illustrates one example of the photographic data appearing on the second representation device 19. Describing, as one example, with the photograph management screen illustrated in FIG. 12(b) appearing on the second representation device 19, upon determining that the user has tapped the display 19a at the location where the confirmation object 135 is shown, the control unit 40 causes the photographic data screen illustrated in FIG. 13(a) to appear on the second representation device 19.

The photographic data screen illustrated in FIG. 13(a) includes an image object 137 and a detail representation switching object 138.

The image object 137 is an image based on the image data recorded in the data storage part 35.

The detail representation switching object 138 is an object for showing the user the location on the display 19a to receive the user operation to show detail information of the image data that corresponds to the image appearing as the image object 137. Upon determining that the user has tapped the display 19a at the location where the detail representation switching object 138 is shown, the control unit 40 causes the photographic data screen illustrated, for example, in FIG. 13(b) to appear on the second representation device 19.

FIG. 13(b) illustrates one example of the photographic data screen to appear on the second representation device 19. Describing, as one example, with the photographic data screen illustrated in FIG. 13(a) appearing on the second representation device 19, upon determining that the user has tapped the display 19a at the location where the detail representation switching object 138 is shown, the control unit 40 causes the photographic data screen illustrated in FIG. 13(b) to appear on the second representation device 19.

The photograph illustrated in FIG. 13(b) includes a detail representation object 139 and an image representation switching object 140.

The detail representation object 139 shows detail information (name of maker, name of tool, date, name of site, name of route, traversing type, name of survey point) of the image data corresponding to the image appearing as the image object 137 in the photographic data screen illustrated in FIG. 13(a).

The image representation switching object 140 is an object for showing the user the location, on the display 19a, to receive the user operation to cause the photographic data screen illustrated in FIG. 13(a) to appear on the second representation device 19. Upon determining that the user has tapped the display 19a at the location where the image representation switching object 140 is shown, the control unit 40 causes the photographic data screen illustrated in FIG. 13(a) to appear on the second representation device 19.

FIG. 13(c) illustrates one example of photograph management screen appearing on the second representation device 19. Describing, as one example, with the photograph management screen illustrated in FIG. 12(b) appearing on the second representation device 19, upon determining that the user has tapped the display 19a at the location where the edit screen switching object 133 is shown, the control unit 40 causes the photograph management screen illustrated in FIG. 13(c) to appear on the second representation device 19.

The photograph management screen illustrated in FIG. 13(c) includes an image object 141, an editor object 142 and a confirmation object 143.

The image object 141 is an image based on an image data to be edited.

The editor object 142 provides the user with various kinds of processing to allow the user to apply desired processing to the image data corresponding to the image shown in the image object 141.

The confirmation object 143 is an object for showing the user the location, on the display 19a, to receive the user operation to store the image data, which corresponds to the image shown in the image object 141, to the data storage part 35. Upon determining that the user has tapped the display 19a at the location where the confirmation object 143 is shown, the control unit 40 causes the photograph management screen, which is illustrated, for example, in FIG. 12(b), to appear on the second representation device 19.

FIG. 14(a) illustrates one example of coordinate measurement screen according to the coordinate measurement function. Describing, as one example, with the main menu screen illustrated in FIG. 5 appearing on the second representation device 19, upon determination that the user has tapped the display 19a at the location where the coordinate measurement function object 50b is shown, the control unit 40 causes the coordinate measurement screen illustrated in FIG. 14(a) to appear on the second representation device 19.

The coordinate measurement screen illustrated in FIG. 14(a) includes an image object 100, a reticle object 101, an object 102, a first angle of view object 111, a second angle of view object 112, a third angle of view object 113, a fourth angle of view object 114, a target search object 115, an AF object 116, a laser pointer object 117, a bubble tube showing object 118, a battery showing object 119, a map showing object 120, an instrument installing object 121, a photographic screen switching object 122, a range finding object 127, a record object 128, a first coordinate measurement point object 144, a second coordinate measurement point object 145, a representation switching object 146, and an AR representation screen switching object 147.

The first coordinate measurement point object 144 is an object for showing the user the location of a coordinate measurement point by graphic representation. The first coordinate measurement point object 144 includes an object 144a and an object 144b.

The object 144a is an object for showing, by graphic representation, the user deviations of the location of an object under survey or target, which location is given by surveying with the surveying instrument 1 (i.e. measurements with the horizontal angle measuring part 31, the vertical angle measuring part, and the range finder 13), in vertical and horizontal directions from the location of the coordinate measurement point. Describing, as one example, the object 144a has a shape indicated by a center circle of cross hairs to cause the circle to indicate the location of the coordinate measurement point.

The object 144b is an object for showing, by graphic representation, the user deviations of the location of the object under survey or target, which location is given by surveying with the surveying instrument 1 (i.e. measurements with the horizontal angle measuring part 31, the vertical angle measuring part 32, and the range finder 13), in fore and aft directions from the location of the coordinate measurement point. Describing, as one example, the object 144b has a shape indicated by an arrow to indicate that the location of the coordinate measurement point is present in the direction of the arrow in the fore and aft directions.

The second coordinate measurement point object 145 is an object for showing the user the location of a coordinate measurement point by character representation. Describing, as one example, the second coordinate measurement point object 145 is an object for showing, by character representation, the user deviations of the location of an object under survey or target, which location is given by surveying with the surveying instrument 1 (i.e. measurements with the horizontal angle measuring part 31, the vertical angle measuring part 32, and the range finder 13), in vertical and horizontal directions and the fore and aft directions from the location of the coordinate measurement point.

In FIG. 14(a), the location of the coordinate measurement point indicated by first coordinate measurement point object 144 and the second coordinate measurement point object 145 is the location of the coordinate measurement point given by an object under survey or target having a height of 1.635 meters.

The representation switching object 146 is an object for showing the user the location to receive the user operation to switch to a coordinate measurement screen, which does not include images based on the image data that the first image sensing unit 11 or the second image sensing unit 12 generates after imaging. Upon determining that the user has tapped the display 19a at the location where the representation switching object 146 is shown, the control unit 40 causes the coordinate measurement screen illustrated in FIG. 14(b) to appear on the second representation device 19.

The AR representation screen switching object 147 is an object for showing the user the location to receive the operator operation to switch between one representation state in which position information indicative of the location of coordinate measurement point determined based on the design data is shown as superimposed on the image based on the image data which the first image sensing unit 11 or the second image sensing unit 12 generates after imaging and another representation state in which the position information is not shown.

With the position information not appearing on the image based on the image data which the first image sensing unit 11 or the second image sensing unit 12 generates after imaging, upon determining that the user has tapped the display 19a at the location where the AR representation switching object 147 is shown, the control unit 40 causes the position data to appear on the second representation device 19 as superimposed on the image data which the first image sensing unit 11 or the second image sensing unit 12 generates after imaging. The position information is shown using augmented reality (AR: Augmented Reality).

With the position information appearing as superimposed on the image based on the image data which the first image sensing unit 11 or the second image sensing unit 12 generates after imaging, upon determining that the user has tapped the display 19a at the location where the AR representation switching object 147 is shown, the control unit 40 causes only the image data which the first image sensing unit 11 or the second image sensing unit 12 generates after imaging to appear on the second representation device 19 without the position information.

FIG. 14(b) illustrates one example of the coordinate measurement screen appearing on the second representation device 19 according to the coordinate measurement function. Describing, as one example, with the coordinate measurement screen illustrated in FIG. 14(a) appearing on the second representation device 19, upon determining that the user has tapped the display 19a at the location where the representation switching object 146 is shown, the control unit 40 causes the coordinate measurement screen illustrated in FIG. 14(b) to appear on the second representation device 19.

The coordinate measurement screen illustrated in FIG. 14(b) includes a laser pointer object 117, a bubble tube showing object 118, a battery showing object 119, a map showing object 120, an instrument setting object 121, a range finding object 127, a record object 128, a first coordinate measurement point object 148, a second coordinate measurement point object 149 and a representation switching object 150.

The first coordinate measurement point object 148 is an object for showing the user the location of a coordinate measurement point by graphic representation. The first coordinate measurement point object 148 is an object for showing, by graphic representation, the user deviations of the location of an object under survey or target, which location is given by surveying with the surveying instrument 1 (i.e. measurements with the horizontal angle measuring part 31, the vertical angle measuring part 32, and the range finder 13), from the location of the coordinate measurement point. The first coordinate measurement point object 148 includes an object for showing the location of an object under survey or target, which location is given by surveying with the surveying instrument 1 (i.e. measurements with the horizontal angle measuring part 31, the vertical angle measuring part 32, and the range finder 13), and an object for showing the location of a coordinate measurement point.

The second coordinate measurement point object 149 is an object for showing the user the location of a coordinate measurement point by character representation. Describing, as one example, the second coordinate measurement point object 149 is an object for showing, by character representation, the user deviations of the location of an object under survey or target, which location is given by surveying with the surveying instrument 1 (i.e. measurements with the horizontal angle measuring part 31, the vertical angle measuring part 32, and the range finder 13), in vertical and horizontal directions from the location of the coordinate measurement point.

A representation switching object 150 is an object for showing the user the location to receive the user operation to switch to a coordinate measurement screen, which includes images based on the image data that the first image sensing unit 11 or the second image sensing unit 12 generates after imaging. Upon determining that the user has tapped the display 19a at the location where the representation switching object 150 is shown, the control unit 40 causes the coordinate measurement screen illustrated in FIG. 14(a) to appear on the second representation device 19.

FIG. 15(a) illustrates one example of coordinate measurement screen appearing on the second representation device 19 according to the coordinate measurement function. Describing, as one example, with the coordinate measurement screen illustrated in FIG. 14(a) appearing on the second representation device 19, upon determination that the user has tapped the display 19a at the location where the AR representation switching object 147 is shown, the control unit 40 causes the coordinate measurement screen illustrated in FIG. 15(a) to appear on the second representation device 19.

The coordinate measurement screen illustrated in FIG. 15(a) includes an image object 100, a reticle object 101, an object 102, a first angle of view object 111, a second angle of view object 112, a third angle of view object 113, a fourth angle of view object 114, a target search object 115, an AF object 116, a laser pointer object 117, a bubble tube showing object 118, a battery showing object 119, a map showing object 120, an instrument installing object 121, a photographic screen switching object 122, a range finding object 127, a record object 128, a first coordinate measurement point object 144, a second coordinate measurement point object 145, a representation switching object 146, an AR representation screen switching object 147, and a design data object 151.

The design data object 151 is an object for showing the user design data by graphic representation. Describing, as one example, the design data object 151 is the object for showing the user a three-dimensional design that is recorded in the data storage device 35.

The design data object 151 includes an object 151a, an object 151b, an object 151c, an object 151d, an object 151e, an object 151f, an object 151g, and an object 151h.

All of the object 151a, object 151b, object 151c, object 151d, object 151e, object 151f and object 151g are objects that show the design coordinates of points included in the design data.

The object 151a is an object that is indicative of the design coordinates of locations of coordinate measurement points indicated by the first coordinate measurement point object 144 and the second coordinate measurement point object 145. The object 151a is an object that is indicative of the design coordinates of location of a coordinate measurement point that is being surveyed for coordinate measurement. In FIG. 15(a), the locations of the coordinate measurement points indicated by the first coordinate measurement point object 144 and the locations of the coordinate measurement points indicated by the second coordinate measurement point object 145 are locations of points measured when an object under survey or target having a height of survey marker of 1.635 meters is used. The locations of the coordinate measurement points indicated by the first coordinate measurement point object 144 and the locations of the coordinate measurement points indicated by the second coordinate measurement point object 125 are the locations of points given when setting an object under survey or target having a height of survey marker of 1.635 meters at each of points indicated by the design coordinates in the design data shown by the design data object 151. The object 151a is shown to enable the user to identify that a point is being under coordinate measurement (i.e. a point is to be surveyed for coordinate measurement from now). Describing, as one example, the object 151a appears in color different from color in which the object 151b, object 151c, object 151d, object 151e, object 151f and object 151g appear. Describing, as one example, the object 151a appears in size different from size (for example, in size relatively bigger than size) in which the object 151b, object 151c, object 151d, object 151e, object 151f and object 151g appear. Describing, as one example, the object 151a appears in shape different from shape in which the object 151b, object 151c, object 151d, object 151e, object 151f and object 151g appear.

Both of the object 151b and the object 151c are objects which indicate the design coordinates of locations of points, each being not yet surveyed for coordination measurement. Both of the objects 151b and 151c are shown to enable the user to identify that the points are not yet surveyed for coordinate measurement.

All of the object 151d, object 151e, object 151f and object 151g are objects which indicate the design coordinates of locations of points completely surveyed for coordinate measurement. All of the object 151d, object 151e, object 151f and object 151g are shown to enable the user to identify that the points are completely surveyed for coordinate measurement.

The object 151h is an object to connect with a straight line a distance between two of the object 151a, object 151b, object 151c, object 151d, object 151e, object 151f and object 151g.

The design data object 151 is represented using augmented reality (AR: Augmented Reality). The image object 100 provides moving images which sequentially appear based on the image data which the first image sensing unit 11 or the second image sensing unit 12 generates after imaging. The control unit 40 causes the design coordinates of that portion of points covered by a design data which is viewed within a range of the image appearing as the image object 100 to appear as the design data object 151 on the second representation device 19, but prevents the design coordinates of the other portion of the points which is not viewed within the range of the image appearing as the image object 100 from appearing as the design data object 151 on the second representation device 19. During operation of angularly displacing the image sensing system 7, after determining, out of the design data, the design coordinates of all points viewed within the range of the image appearing as the image object 100, the control unit 40 causes the determined design coordinates to keep on appearing as the design data object 151 on the second representation device 19 in response to angular displacement of the image sensing system 7.

The control unit 40 is allowed to prevent the design data object 151 from appearing on the second representation device 19 during operation of angularly displacing the image sensing system 7. Describing, as one example, the control unit 40 prevents the design data object 151 from appearing on the second representation device 19 during operation of angularly displacing the image sensing system 7, but the control unit 40 causes the design data object 151 to appear on the second representation device 19 upon the image sensing system 7 coming to a stop. Describing, as one example, during a period beginning with angularly displacing the image sensing system 7 (for example, angularly displacing the image sensing system 7 beyond a predetermined angle from a stationary position) and ending with receiving the user operation to cause the design data object 151 to appear on the second representation device 19, the control unit 40 prevents the design data object 151 from appearing on the second representation device 19 even if the image sensing system 7 comes to a stop, but the control unit 40 causes the design data object 151 to appear on the second representation device 19 upon receiving the user operation to cause the design data object 151 to appear on the second representation device 19.

The control unit 40 is allowed not to cause the design coordinates of all points, which are viewed within a range of the image that appears as the image object 100, to appear as the design data object 151 on the second representation device 10. Describing, as one example, the control unit 40 is allowed to cause the design coordinates of not all points, which are viewed within the range of the image that appears as the image object 100, but a predetermined number of the all points, to appear as the design data object 151 on the second representation device 19. Describing, as one example, among the design coordinates of all points viewed within the range of the image that appears as the image object 100, the control unit 40 causes the design coordinates of a predetermined number of points that have been surveyed, the design coordinates of a predetermined number of points that are being surveyed and the design coordinates of a predetermined number of points that have not been surveyed to appear as the design data object 151 on the second representation device 19. Describing, as one example, the control unit 40 causes a predetermined number (for example, the closest five from a present point that is being surveyed in a predetermined order in which the points are to be surveyed) each of such objects like the object 151*b* and the object 151*c* which include the design coordinates of points that have not been completely surveyed and such objects like the objects 151*d*, 151*e*, 151*f* and 151*g* which include the design coordinates of points that have been completely surveyed to appear as the design data object 151 on the second representation device 19 together with an object including the design coordinates of points that are being surveyed. Describing, as one example, the control unit 40 updates the design data object 151 in the order in which the points are to be surveyed every time surveying one point is completed and causes the updated design data object 151 to appear on the second representation device 19.

FIG. 15(*b*) illustrates one example of survey image appearing on the second representation device 19 according to the survey function. In FIG. 15(*a*), two points of a plurality of points, each having the design coordinates, are connected by a straight line, but, in FIG. 15(*b*), the surveying instrument 1 and one of a plurality of points, each having the design coordinates are connected by a straight line. It is allowed to enable the user to identify a point, with the design coordinates, that is completely surveyed and a point, with the design coordinates, that is not surveyed yet by differentiating in representation form a straight line connecting the surveying instrument 1 to the point that has is completely surveyed and a straight line connecting the surveying instrument 1 to the point that is not surveyed yet. Describing, as one embodiment, the control unit 40 connects a distance between the surveying instrument 1 and a point that is completely surveyed without a straight line and connects a distance between the surveying instrument 1 and a point that is not completely surveyed with a straight line and causes them to appear on the second representation device 19.

The foregoing description has advanced by giving an example of causing the coordinate measurement function to showing the design data to the user, but this is only one example. For example, the observation function may show the design data to the user. For example, according to the work progress observation, the control unit 40 causes the image, which is based on the image data that the first image sensing unit 11 or the second image sensing unit generates after imaging, the design data and deviations from the design data to appear on the second representation device 19.

Figure 16:
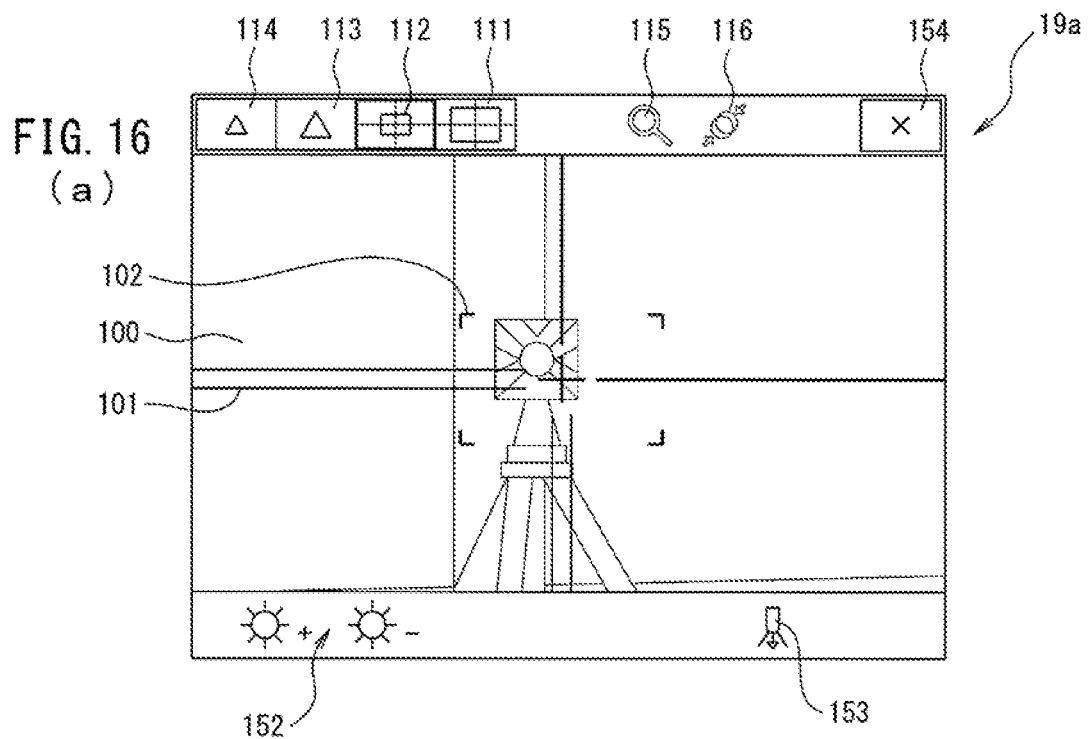
FIG. 16(a) illustrates one example of a live view screen appearing on the second representation device 19 according to a live view function.
FIG. 16(b) illustrates one example of a live view screen appearing on the second representation device 19 according to the live view function.
Figure 16:
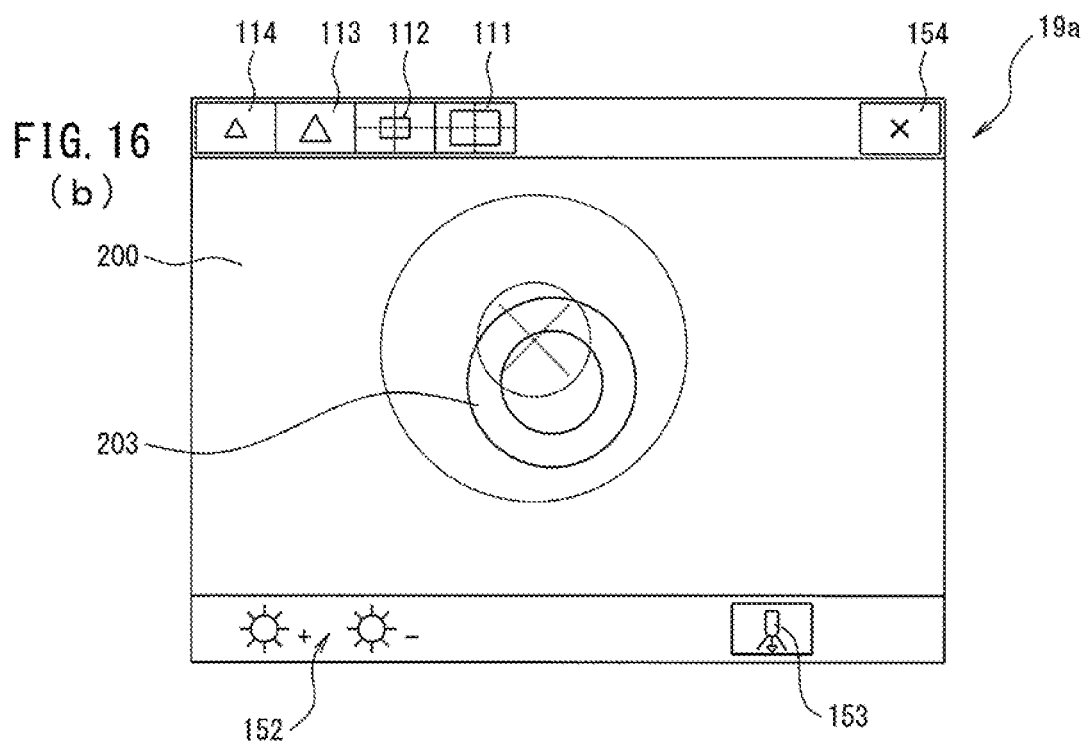

FIG. 16(*a*) illustrates one example of live view screen that appears on the second representation device 19 according to a live view function. Describing, as one example, the live view function is performed as interruption processing. Describing, as one example, with the main menu screen illustrated in FIG. 5 appearing on the second representation device 19, upon determining that a live view button 19*b* has received the user operation, the control unit 40 causes the live view screen illustrated in FIG. 16(*a*) to appear on the second representation device 19. Describing, as one example, the control unit 40 is allowed to prevent the live view screen illustrated in FIG. 16(*a*) from appearing on the second representation device 19 even though the control unit 40 determines that the live view button 19*b* has received the user operation when the image, which is based on the image data that the first image sensing unit 11 or the second image sensing unit 12 generates after imaging, like, for example, the observation screen illustrated in FIG. 6 or the coordinate measurement screen illustrated in FIG. 14(*a*) appears on the second representation device 19.

The live view screen illustrated in FIG. 16(*a*) includes an image object 100, a reticle object 101, an object 102, a first angle of view selecting object 111, a second angle of view selecting object 112, a third angle of view selecting object 113, a fourth angle of view selecting object 114, a target search object 115, an AF object 116, an exposure compensation object 152, an image sensing unit switching object 153, and an end object 154.

The exposure compensation object 152 is an object for showing the user the location which receives the user operation to carry out exposure compensation, i.e. a feature to allow the user to adjust the automatically calculated exposure value for the first image sensing unit 11 or the second image sensing unit 12 to make the image brighter or darker.

The image sensing unit switching object 153 is an object for showing the user the location which receives the user operation to cause the moving image, which appears sequentially based on the image data that the third image sensing unit 14 generates after imaging in a sequential order, to appear on the second representation device 19 in place of the moving image, which appears sequentially based on the image data that the first image sensing unit 11 or the second image sensing unit 12 generates after imaging in a sequential order.

The end object 154 is an object for showing the user the location which receives the user operation to cause the live view function to end.

FIG. 16(*b*) illustrates one example of live view screen that appears on the second representation device 19 according to a live view function. Describing, as one example, with the live view screen illustrated in FIG. 16(*a*) appearing on the second representation device 19, upon determining that the user has tapped the display 19*a* at the location where the image sensing unit switching object 153 appears, the control unit 40 causes the live view screen illustrated in FIG. 16(*b*) to appear on the second representation device 19.

The live view screen illustrated in FIG. 16(*b*) includes an image object 200, a reticle object 203, the first angle of view selecting object 111, the second angle of view selecting object 112, the third angle of view selecting object 113, the fourth angle of view selecting object 114, the exposure compensation object 152, the image sensing unit switching object 153, and the end object 154.

The image object 200 is an image based on the image data that the third image sensing unit 3 generates after imaging. The reticle object 203 is an electronically represented reticle. The control unit 40 causes the electronic reticle to appear on the second representation device 19 as superimposed on the image, which is based on the image data that the third image sensing unit 14 generates after imaging.

The image sensing unit switching object 153 is an object for showing the user the location which receives the user operation to cause the moving image, which appears sequentially based on the image data that the first image sensing unit 11 or the second image sensing unit 12 generates after imaging in a sequential order, to appear on the second representation device 19 in place of the moving image, which appears sequentially based on the image data that the third image sensing unit 14 generates after imaging in a sequential order.

With the live view screen illustrated in FIG. 16(a) or FIG. 16(b) appearing, upon determining that the live view button 19b has received the user operation, the control unit 40 reinstates the previous state before the execution of the live view function.

Description on one example of survey using the observation function of the surveying instrument 1 follows.

First, immediately after installing the surveying instrument 1 at a predetermined location and turning on a main switch, not illustrated, the control unit 40 causes an image (for example, an image having the fourth angle of view), which is based on image data that the second image sensing unit 12 generates after imaging, to appear on the second representation device 19.

The user taps the display 19a at the location where the image object 100 is shown to align the line of collimation of the image sensing system 7 with an object to be surveyed. According to the embodiment, this configuration permits rotational movements of the line of collimation of the image sensing system 7 by tapping the second representation device 19 and improves efficiency of the user's work.

The user takes a rough alignment of the line of collimation of the image sensing system 7 with the object to be surveyed by checking a direction to be collimated using a plurality of images, having different angles of view, appearing on the second representation device 19, by gradually zooming in the image, and by zooming in one of segmented images. According to the embodiment, this configuration lowers the likelihood of losing sight of the object to be surveyed and improves efficiency of the user's work.

Next, when taking a rough alignment of the line of collimation of the image sensing system 7 with the object to be surveyed, the user switches the image to an image based on image data that the first image sensing unit 11 generates after imaging. Upon switching, the control unit 40 sets imaging conditions for the first image sensing unit 11 based on the imaging conditions when the proper exposure is obtained by the automatic exposure at the second image sensing unit 12 and lessens level the user feel strange.

Next, the user operates the horizontal slow-motion control knob 23 and the vertical slow-motion control knob 24 to precisely bring the line of collimation of the image sensing system 7 into alignment with the object to be surveyed. During this operation, the control unit 40 causes the reticle to change its appearance in response to the brightness and pattern around the object to the surveyed or causes the reticle to change its pattern at the request of the user.

Next, when bringing the line of collimation of the image sensing system 7 into alignment with the object to be surveyed, the user causes the surveying instrument 1 to carry out ranging to record measurement data (including position data, distance, angles, etc.). During this operation, the user is allowed to change the reticle pattern to one with scales or grid and record the images with the reticle appearing on the image.

Description on one example of coordinate measurement using the coordinate measurement function of the surveying instrument 1 follows. The coordinate measurement is initiated by preselecting measurement points to be surveyed based on a three-dimensional design data and confirming the locations of the selected measurement points on the spot (or site).

The user opens data base created for the site in advance or creates new data base. Next, the user operates the communication device 20 to enter coordinate data for coordinate measurement of measuring points from outside or manually enters the coordinate data to save them in the data base.

Next, the user creates a list of measuring points to be under coordinate measurements by selecting out of the data base measuring points for coordinate measurement in surveying this time or by manually entering coordinates. Next, the user installs the surveying instrument 1. The control unit 40 causes that at least one of measuring points on the created list which exists at a location far away from the installation place of the surveying instrument along the line of collimation of the image sensing system 7 to appear as superimposed on the corresponding location within the image.

The user selects a measuring point to be surveyed out of the listed measuring point(s) appearing as superimposed on the image. The control unit 40 aligns the line of collimation with the selected measuring point. The user conducts surveying of a measuring point that is the location of an object under survey or target, acquires coordinates of the measuring point and compares the acquired coordinates with the coordinates of design stored in the data base. The control unit 40 causes a deviation of the acquired coordinates from the coordinates of the design to appear.

The user determines whether or not the deviation from the coordinates of the design is sufficiently small. The user conducts the surveying again upon determination that the deviation is not sufficiently small. Upon determination that the deviation is small, the user records the measured data and determines whether or not there are measuring points not yet surveyed. Upon determination that there are measuring points not yet surveyed, the user selects next one measuring point and conducts surveying. Upon determination that there remain no measuring points not yet surveyed, the user terminates the surveying.

The foregoing description takes an example of causing the screens illustrated in FIG. 5 to FIG. 20 to appear on the second representation device 19, but the screens are allowed to appear on the first representation device 18.

DESCRIPTION OF REFERENCE NUMERALS 1 surveying instrument
2 leveling system
3 base plate
4 mount
5 level screw
6 main unit
7 image sensing system
8 first objective lens
9 second objective lens
10 third objective lens
11 first image sensing unit
12 second image sensing unit
13 range finder
14 third image sensing unit
15 horizontal angle driver
17 vertical angle driver
18 first representation device
19 second representation device
20 communication device
21 encoder for horizontal angle operating part
22 encoder for vertical angle operating part
23 horizontal angle operating part
24 vertical angle operating part
25 gripper 31 horizontal angle measuring part
32 vertical angle measuring part
33 image processor
34 temporary data storage part
40 data storage part
50a control unit
50a observation function object
50b coordinate measurement function object
100 image object
101 reticle object
110 object
111 first angle of view selecting object
112 second angle of view selecting object
113 third angle of view selecting object
114 fourth angle of view selecting object
115 target search object
116 AF object
117 laser pointer object
118 bubble tube showing object
119 battery showing object
120 map showing object
121 instrument setting object
122 photographic screen switching object
123 AR representation screen switching object
124 text representation screen switching object
125 function switching object
126 observation, input and setup object
126a observation object
126b input object
126c setup object
127 range finding object
128 record object
129 distance indicator object
130 photographing instructing object
131 recorded image data list object
132 search object
133 edit screen switching object
134 deletion object
135 confirmation object
136 end object
137 image object
138 detail representation switching object
140 image representation switching object
141 image object
142 editor object
143 confirmation object
144 first coordinate measurement point object
145 second coordinate measurement point object
146 representation switching object
147 AR representation screen switching object
148 first coordinate measurement point object
149 second coordinate measurement point object
150 representation switching object
151 design data object
152 exposure compensation object
153 third image sensing unit switching object
154 end object
155 object
200 image object
201 first bubble tube object
202 second bubble tube object
203 reticle object
204 tripod vertical position object
205 level screw object
206 confirmation object

The invention claimed is:

1. A surveying instrument comprising:
a survey system configured to survey an object under survey;
an image sensing system, to be pointed in a direction toward the object under survey, the image sensing system including a first image sensing unit having a first angle of view and a second image sensing unit having a second angle of view wider than the first angle of view of the first image sensing unit;
a horizontal angle driver configured to rotate the survey system and the image sensing system around a vertical axis of the surveying instrument;
a vertical angle driver configured to rotate the survey system and the image sensing system around a horizontal axis of the surveying instrument;
a data storage part configured to store design data;
an angle detecting part configured to detect an angle of a collimation direction relative to a bearing; and
a control unit configured to cause an image to appear on a representation device, the image being based on image data that the first image sensing unit or the second image sensing unit generates after imaging, the control unit being further configured to cause (i) a design data object and (ii) coordinate measurement point objects to appear on the representation device in response to the design data stored in the data storage part and the angle detected by the angle detecting part, the design data object showing locations of a portion of the design data that is included in the image, the coordinate measurement point objects showing locations of coordinate measurement points to be surveyed by the survey system and corresponding to the portion of the design data that is included in the image, wherein
the coordinate measurement point objects that the control unit causes to appear on the representation device include a first coordinate measurement point object that shows deviations of a location of the object under survey, the location being given by surveying with the survey system, the deviations of the location being in fore and aft directions from the location of one of the coordinate measurement points to be surveyed by the survey system and corresponding to the portion of the design data which is included in the image, the first coordinate measurement point object being displayed as an arrow, a pointing direction of the arrow varying depending on whether the deviation is in the fore direction or in the aft direction.

2. The surveying instrument as claimed in claim 1, wherein
the coordinate measurement point objects that the control unit causes to appear on the representation device include a second coordinate measurement point object that shows, by graphic representation, deviations of the location of the object under survey, which location is given by surveying with the survey system, the deviations of the location being in vertical and horizontal directions from the location of the one of the coordinate measurement points to be surveyed by the survey system and corresponding to the portion of the design data which is included in the image.

3. The surveying instrument as claimed in claim 1, wherein
the design data object that the control unit causes to appear on the representation device includes a first design data object which indicates a portion of the design data relating to a location of a point surveyed by the survey system for coordinate measurement and a second design data object which indicates a portion of the design data relating to a location of a point not yet surveyed by the survey system for coordination measurement.

4. The surveying instrument as claimed in claim 3, wherein
the design data object that the control unit causes to appear on the representation device includes a third design data object which indicates a portion of the design data relating to a location of a point that currently is being surveyed by the survey system for coordinate measurement.

5. The surveying instrument as claimed in claim 1, wherein
the control unit prevents the design data object from appearing on the representation device during the horizontal angle driver's operation of angularly displacing the survey system and the image sensing system around the vertical axis of the surveying instrument.

6. The surveying instrument as claimed in claim 1, wherein
the control unit prevents the design data object from appearing on the representation device during the vertical angle driver's operation of angularly displacing the survey system and the image sensing system around the horizontal axis of the surveying instrument.

7. The surveying instrument as claimed in claim 1, wherein
the control unit causes the image, the design data object, the coordinate measurement point objects, and a reticle object that shows a reticle used for alignment, to appear on the representation device.

8. The surveying instrument as claimed in claim 7, wherein
the control unit changes the reticle object in representation form in response to the image data that the first image sensing unit or the second image sensing unit generates after imaging and causes the changed reticle object to appear on the representation device.

9. The surveying instrument as claimed in claim 7, wherein
the survey system includes a range finder configured to measure a distance to the object under survey, and
the control unit causes the reticle object to appear on the representation device such that (a) the reticle object appears in a first representation form before the range finder measures the distance to the object under survey, and (b) the reticle object appears in a second representation form that is different from the first representation form after the range finder measures the distance to the object under survey.

10. The surveying instrument as claimed in claim 7, wherein
the control unit causes the data storage part to record synthesized data, given by combining the reticle object appearing on the representation device with an image based on the image data that the first image sensing unit or the second image sensing unit generates after imaging, in response to a photographing instruction.

11. The surveying instrument as claimed in claim 1, wherein
when switching from causing a second image, which is based on the image data that the second image sensing unit generates after imaging, to appear on the representation device to causing a first image, which is based on the image data that the first image sensing unit generates after imaging, to appear on the representation device, the control unit causes the first image, which is based on the image data that the first image sensing unit generates after imaging, to appear on the representation device after setting imaging conditions for the first image sensing unit based on imaging conditions when a proper exposure is obtained by an automatic exposure at the second image sensing unit.

12. The surveying instrument as claimed in claim 1, further comprising:
a tilt detector configured to detect a tilt of the vertical axis of the surveying instrument; wherein
the image sensing system includes a third image sensing unit that takes an image of a part below the surveying instrument to generate third image data; and
the control unit causes a bubble tube object that indicates the tilt of the vertical axis of the surveying instrument, detected by the tilt detector, by graphic representation, and a third image, which is based on the third image data that the third image sensing unit generates after imaging, to appear on the representation device.

13. The surveying instrument as claimed in claim 12, wherein
the control unit causes a first bubble tube object that imitates a shape of a circular bubble tube, and a second bubble tube object that is higher in sensitivity than the first bubble tube object and that imitates a shape of a bar bubble tube, to appear on the representation device as the bubble tube object.

14. The surveying instrument as claimed in claim 12, wherein
the control unit causes the bubble tube object, the data, which is based on the third image data that the third image sensing unit generates after imaging, and a tripod vertical position object that indicates a tripod vertical position, to appear on the representation device.

15. The surveying instrument as claimed in claim 12, wherein
the control unit causes the bubble tube object, the third image, which is based on the third image data that the third image sensing unit generates after imaging, and a reticle object that indicates a reticle for plumbing, to appear on the representation device.

16. The surveying instrument as claimed in claim 1, further comprising:
the representation device; wherein
the representation device includes a touch screen.

17. The surveying instrument as claimed in claim 16, wherein
upon determination that a user has tapped the representation device at a location where the image, which is based on the image data that the first image sensing unit or the second image sensing unit generates after imaging, the control unit causes the horizontal angle driver and the vertical angle driver to rotate the survey system and the image sensing system in response to the location tapped by the user.

18. The surveying instrument as claimed in claim 17, wherein
upon the determination that the user has tapped the representation device at the location where areas including left and right end portions of the image, which is based on the image data that the first image sensing unit or the second image sensing unit generates after imaging, appear, the control unit causes the horizontal angle driver to rotate the survey system and the image sensing system such that a line of collimation is tilted by one horizontal angle of view.

19. The surveying instrument as claimed in claim 18, wherein
the control unit causes the horizontal angle driver to rotate the survey system and the image sensing system at a first speed during a first period, at a second speed that is lower than the first speed during a second period that follows the first period, and at the first speed during a third period that follows the second period such that the line of collimation is tilted by one horizontal angle of view.

20. The surveying instrument as claimed in claim 19, wherein
upon the determination that the user has tapped the representation device at the location where areas including upper and lower end portions of the image, which is based on the image data that the first image sensing unit or the second image sensing unit generates after imaging, appear, the control unit causes the vertical angle driver to rotate the survey system and the image sensing system such that the line of collimation is tilted by one vertical angle of view.

21. The surveying instrument as claimed in claim 20, wherein
the control unit causes the vertical angle driver to rotate the survey system and the image sensing system at a first speed during a first period, at a second speed that is lower than the first speed during a second period that follows the first period, and at the first speed during a third period that follows the second period such that the line of collimation is tilted by one vertical angle of view.

22. The surveying instrument as claimed in claim 21, wherein
upon the determination that the user has tapped the representation device at the location where an area excluding the left and right end portions and the upper and lower end portions of the image, which is based on the image data that the first image sensing unit or the second image sensing unit generates after imaging, appear, the control unit causes the horizontal angle driver and the vertical angle driver to rotate the survey system and the image sensing system until the image sensing system is pointed in a direction toward the location that was tapped.

23. The surveying instrument as claimed in claim 16, wherein
upon a determination that a user has tapped the representation device to select any one of plural partitions set for the image, which is based on the image data that the first image sensing unit or the second image sensing unit generates after imaging, the control unit magnifies the image within the selected partition and causes the magnified image to appear on the representation device.

24. The surveying instrument as claimed in claim 1, wherein
the control unit causes a first image, which is based on the image data that the first image sensing unit generates after imaging, and a second image, which is based on the image data that the second image sensing unit generates after imaging, to appear on the representation device.

25. The surveying instrument as claimed in claim 1, wherein
the control unit causes the image, which is based on the image data that the first image sensing unit or the second image sensing unit generates after imaging, and an object for showing an angle of view that is established after making a change to an angle of view of the image toward the telephoto end in advance before the change, to appear on the representation device.

26. A non-transitory computer-readable recording medium on which is stored a program executable in a surveying instrument including:
a survey system configured to survey an object under survey;
an image sensing system, to be pointed in a direction toward the object under survey, including a first image sensing unit having a first angle of view and a second image sensing unit having a second angle of view wider than the first angle of view of the first image sensing unit;
a horizontal angle driver configured to rotate the survey system and the image sensing system around a vertical axis of the surveying instrument;
a vertical angle driver configured to rotate the survey system and the image sensing system around a horizontal axis of the surveying instrument;
a data storage part configured to store design data; and
an angle detecting part configured to detect an angle of a collimation direction relative to a bearing,
the program causing an image to appear on a representation device, the image being based on image data that the first image sensing unit or the second image sensing unit generates after imaging, the program further causing (i) a design data object and (ii) coordinate measurement point objects to appear on the representation device in response to the design data stored in the data storage part and the angle detected by the angle detecting part, the design data object showing locations of a portion of the design data that is included in the image, the coordinate measurement point objects showing locations of coordinate measurement points to be surveyed by the survey system and corresponding to the portion of the design data that is included in the image, wherein
the coordinate measurement point objects that are caused to appear on the representation device include a first coordinate measurement point object that shows deviations of a location of the object under survey, the location being given by surveying with the survey system, the deviations of the location being in fore and aft directions from the location of one of the coordinate measurement points to be surveyed by the survey system and corresponding to the portion of the design data which is included in the image, the first coordinate measurement point object being displayed as an arrow, a pointing direction of the arrow varying depending on whether the deviation is in the fore direction or in the aft direction.

27. The non-transitory computer-readable recording medium according to claim 26, wherein
the coordinate measurement point objects that are caused to appear on the representation device include a second coordinate measurement point object that shows, by graphic representation, deviations of the location of the object under survey, which location is given by surveying with the survey system, the deviations of the locations being in vertical and horizontal directions from the location of the one of the coordinate measurement points to be surveyed by the survey system and corresponding to the portion of the design data which is included in the image.

* * * * *